United States Patent
Yuan et al.

(10) Patent No.: US 12,464,420 B2
(45) Date of Patent: Nov. 4, 2025

(54) COMMUNICATION METHOD AND COMMUNICATION APPARATUS

(71) Applicant: HUAWEI TECHNOLOGIES CO., LTD., Guangdong (CN)

(72) Inventors: Shitong Yuan, Chengdu (CN); Fengwei Liu, Chengdu (CN); Jing Qiu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 609 days.

(21) Appl. No.: 17/885,634

(22) Filed: Aug. 11, 2022

(65) Prior Publication Data

US 2022/0386187 A1 Dec. 1, 2022

Related U.S. Application Data

(63) Continuation of application No. PCT/CN2020/074937, filed on Feb. 12, 2020.

(51) Int. Cl.
*H04W 36/00* (2009.01)
*H04W 36/08* (2009.01)
(Continued)

(52) U.S. Cl.
CPC ... *H04W 36/0061* (2013.01); *H04W 36/0058* (2018.08); *H04W 36/087* (2023.05);
(Continued)

(58) Field of Classification Search
CPC ......... H04W 36/0061; H04W 36/0058; H04W 36/087; H04W 74/0841; H04W 88/08;
(Continued)

(56) References Cited

U.S. PATENT DOCUMENTS

2019/0394738 A1* 12/2019 Abedini ............ H04W 56/0015
2021/0227435 A1* 7/2021 Hsieh ................. H04W 36/087
(Continued)

FOREIGN PATENT DOCUMENTS

CN 102076041 A 5/2011
CN 110662266 A 1/2020
(Continued)

OTHER PUBLICATIONS

Huawei: "BL CR to 38.401 Support for IAB", 3GPP Draft; R3-200022, vol. RAN WG3, No. E-meeting; Feb. 24, 2020-Mar. 6, 2020 Feb. 11, 2020 (Feb. 11, 2020), XP051853779, total 17 pages.
(Continued)

*Primary Examiner* — Mang Hang Yeung

(57) ABSTRACT

A communication method and a communication apparatus are disclosed. The communication method includes: An integrated access and backhaul (IAB) node receives first configuration information from a source donor base station, where the first configuration information includes N pieces of configuration information of a mobile terminal (MT) and N pieces of configuration information of a distributed unit (DU) that are configured by N target donor base stations for the IAB node; and the DU of the IAB node uses one piece of configuration information in the N pieces of configuration information of the DU when the MT of the IAB node satisfies a specific condition, where N is greater than or equal to 1, the MT is configured to communicate with a parent node of the IAB node, the source donor base station, or the target donor base station, and the DU is configured to communicate with a child node of the IAB node or a terminal.

15 Claims, 10 Drawing Sheets

(51) Int. Cl.
*H04W 74/0833* (2024.01)
*H04W 88/08* (2009.01)

(52) U.S. Cl.
CPC .... *H04W 74/0841* (2013.01); *H04W 74/0833* (2013.01); *H04W 88/08* (2013.01)

(58) Field of Classification Search
CPC ........... H04W 74/0833; H04W 84/047; H04W 74/002
USPC ......................................................... 370/331
See application file for complete search history.

(56) References Cited

U.S. PATENT DOCUMENTS

2022/0141749 A1* 5/2022 Luo ...................... H04W 40/24
370/331
2022/0361067 A1* 11/2022 Koskinen ........... H04B 7/15528

FOREIGN PATENT DOCUMENTS

| EP | 4014693 | A1 | 6/2022 |
| WO | 2019154060 | A1 | 8/2019 |
| WO | 2019242612 | A1 | 12/2019 |
| WO | 2020027491 | A1 | 2/2020 |
| WO | 2021032905 | A1 | 2/2021 |

OTHER PUBLICATIONS

Qualcomm: "New WID on Enhancements to Integrated Access and Backhaul", 3GPP Draft; RP-193093, vol. TSG RAN, No. Sitges, Spain; Dec. 9, 2019-Dec. 12, 2019 Dec. 8, 2019 (Dec. 8, 2019), XP051838725, total 5 pages.
Zte et al: "Discussion on inter-CU IAB migration handling", 3GPP Draft; R3-196689, vol. RAN WG3, No. Reno, USA; Nov. 18, 2019-Nov. 22, 2019 Nov. 9, 2019 (Nov. 9, 2019), XP051823893, total 4 pages.
Extended European Search Report issued in EP20918995.0, dated Mar. 6, 2023, 10 pages.
Samsung, IAB failure recovery as part of route management. 3GPP TSG-RAN WG3-AH 1807, Montreal, Canada, Jul. 2-6, 2018, R3-183865, 4 pages.
3GPP TS 38.331 V15.8.0 (Dec. 2019), 3rd Generation Partnership Project; Technical Specification Group Radio Access Network; NR; Radio Resource Control (RRC) protocol specification (Release 15), 532 pages.
3GPP TR 38.874 1.0.0 (Dec. 2018), 3rd Generation Partnership Project; Technical Specification Group Radio Access Network; Study on Integrated Access and Backhaul; (Release 15), 111 pages.
3GPP TS 38.213 V16.0.0 (Dec. 2019), 3rd Generation Partnership Project; Technical Specification Group Radio Access Network; NR; Physical layer procedures for control (Release 16), 146 pages.
3GPP TS 38.211 V16.0.0 (Dec. 2019), 3rd Generation Partnership Project; Technical Specification Group Radio Access Network; NR; Physical channels and modulation (Release 16), 129 pages.
3GPP TS 38.473 V16.0.0 (Dec. 2019), 3rd Generation Partnership Project; Technical Specification Group Radio Access Network; NG-RAN; F1 application protocol (F1AP) (Release 16), 239 pages.
International Search Report and Written Opinion issued in PCT/CN2020/074937, dated Nov. 17, 2020, 9 pages.
Office Action issued in CN202080094489.7, dated Jul. 14, 2023, 5 pages.

* cited by examiner

COMMUNICATION METHOD AND COMMUNICATION APPARATUS

CROSS-REFERENCE TO RELATED APPLICATIONS

This application is a continuation of International Application No. PCT/CN2020/074937, filed on Feb. 12, 2020, the disclosure of which is hereby incorporated by reference in its entirety.

TECHNICAL FIELD

This application relates to the field of communication technologies, and in particular, to a communication method and a communication apparatus.

BACKGROUND

To improve a capacity and coverage of a network, a relay link supporting wireless backhaul transmission is proposed to implement dense network deployment. A node supporting a relay function is referred to as a relay node for short. The relay node provides functions and services similar to those of an ordinary base station to a terminal accessing a cell of the relay node. A communication link between the relay node and the terminal is referred to as an access link. The relay node accesses a base station serving the relay node, through a radio interface in a manner similar to that of the terminal. The base station is referred to as a donor base station (Donor). A radio interface link between the relay node and the donor base station is referred to as a backhaul link.

Future communication technologies support higher bandwidths and larger-scale multi-antenna or multi-beam transmission, and provide a condition for a relay in which the access link and the backhaul link share an air interface resource, that is, provide a condition for a relay in which a wireless access link and a wireless backhaul link are integrated. The relay in which the wireless access link and the wireless backhaul link are integrated may be referred to as an integrated access and backhaul (IAB) node. It should be understood that the IAB node establishes a wireless backhaul link to one or more parent nodes, and accesses a core network by using the parent nodes. The IAB node may also provide an access service for a plurality of child nodes and terminals.

Link communication between the IAB node and a parent node may be interrupted because the backhaul link or the access link is in a poor link state, congested, or the like, and cross-donor base station handover may be performed. How to perform the cross-donor base station handover of the IAB node is a problem that needs to be resolved.

SUMMARY

This application provides a communication method and a communication apparatus, to implement cross-donor base station handover of an IAB node.

According to a first aspect, a communication method is provided. The method may be performed by a first communication apparatus. The first communication apparatus may be a communication device or a communication apparatus, for example, a chip system, that can support the communication device in implementing a function required in the method. The following provides descriptions by using an example in which the communication device is an IAB node. The Method Includes:

The IAB node receives first configuration information from a source donor base station, where the first configuration information includes N pieces of configuration information of a mobile terminal (MT) and N pieces of configuration information of a distributed unit (DU) that are configured by N target donor base stations for the IAB node, N is greater than or equal to 1, the MT is configured to communicate with a parent node of the IAB node, the source donor base station, or the target donor base station, and the DU is configured to communicate with a child node of the IAB node or a terminal; and the DU of the IAB node uses one piece of configuration information in the N pieces of configuration information of the DU when the MT of the IAB node satisfies a specific condition.

In this embodiment, the DU of the IAB node uses a piece of configuration information that is of the DU and that is configured by the target donor base station for the IAB node, only when the MT of the IAB node satisfies the specific condition. It can be learned that, according to the method provided in this embodiment, an occasion on which the IAB node uses a piece of configuration information that is of the DU and that is from the target donor base station is specified, and the occasion is that the MT of the IAB node satisfies the specific condition. Because the DU of the IAB node uses new configuration information provided that the MT satisfies the specific condition, in a process of implementing cross-donor base station handover of the IAB node, a conflict between a resource for the DU of the IAB node to send, for example, a synchronization signal block (SSB) and a resource for the MT of the IAB node to send an SSB can be avoided, thereby avoiding a communication exception of a terminal as much as possible.

In a possible implementation, the specific condition includes but is not limited to one or more of the following conditions:

Condition 1: A result of measuring a first signal by the MT of the IAB node is less than a first preset threshold, where the first signal is sent by the parent node currently connected to the IAB node or the source donor base station. When the result of measuring the first signal by the MT of the IAB node is less than the first preset threshold, it may be considered that communication quality of a current backhaul link of the IAB node is poor. In this case, the IAB node may hand over to, for example, the target donor base station, to ensure the communication quality of the backhaul link of the IAB node as much as possible. In this case, the DU of the IAB node uses the new configuration information, to implement handover of the parent node of the IAB node.

Condition 2: A result of measuring a second signal by the MT of the IAB node is greater than a second preset threshold, where the second signal is not sent by the parent node currently connected to the IAB node or the source donor base station. When the result of measuring the second signal by the MT of the IAB node is greater than the second preset threshold, it may be considered that there is another IAB node or network node (for example, the target donor base station), and a result of measuring, by the MT of the IAB node, a signal sent by the another IAB node or network node is better than a result of measuring, by the MT of the IAB node, a signal sent by the parent node currently connected to the IAB node or the source donor base station. In this case, the IAB node may hand over to the target donor base station, to improve communication quality of a backhaul link of the IAB node as much as possible, and the DU of the IAB node uses the new configuration information, to implement handover of the parent node of the IAB node.

Condition 3: A beam failure occurs on the MT of the IAB node on a first carrier link, where the first carrier link is a communication link between the IAB node and the parent node currently connected to the IAB node or the source donor base station.

Condition 4: A radio link failure occurs on the MT of the IAB node on a second carrier link, where the second carrier link is a communication link between the IAB node and the parent node currently connected to the IAB node or the source donor base station.

The foregoing condition 3 and condition 4 may be considered as that a backhaul link of the IAB node is interrupted or blocked. In this case, the IAB node may perform handover of the parent node currently connected to the IAB node or the source donor base station, to ensure communication quality of the backhaul link of the IAB node as much as possible. In addition, in this case, the DU of the IAB node uses the new configuration information, to implement handover of the parent node of the IAB node.

Condition 5: a duration accumulated since the MT of the IAB node receives the configuration information from the source donor base station satisfies a preset duration. The condition may be considered as that a clock is preset, and after the MT of the IAB node receives the configuration information and the clock expires, the DU of the IAB node uses the new configuration information. In this way, the IAB node does not need to perform measurement or the like, and implementation of the IAB node is simpler.

Condition 6: The MT of the IAB node starts or completes a random access process. Usually, when the MT of the IAB node starts or completes the random access process, it may be considered that the IAB node performs handover of a backhaul link. In this case, the DU of the IAB node uses the new configuration information. In this way, the IAB node also does not need to perform measurement or the like, and implementation of the IAB node is simpler.

Condition 7: The MT of the IAB node receives first signaling from the source donor base station, where the first signaling is used to indicate the IAB node to hand over to a first target donor base station. In the condition, the IAB node performs handover of the currently connected parent node according to an instruction of the source donor base station, and does not need to determine a handover occasion. This can reduce calculation load of the IAB node, make implementation of the IAB node simpler, and more facilitate resource management on a network side.

Condition 8: The IAB node moves out of a target area. When the IAB node is mobile, the IAB node may move out of a coverage range of the parent node or move to an area with poor signal quality. In the condition, that the IAB node is located in the target area may be considered as that communication quality of a current backhaul link of the IAB node is high, and when the IAB node moves out of the target area, it is considered that, to ensure the communication quality, the IAB node may perform handover of the parent node of the IAB node, that is, the DU of the IAB node uses the new configuration information.

The foregoing lists eight possible specific conditions. A specific condition to be specifically selected may be configured by a base station or specified in a protocol, to avoid a conflict between a resource for the DU of the IAB node to send an SSB and a resource for the MT of the IAB node to send an SSB.

In a possible implementation, a manner of determining whether the IAB node moves out of the target area includes but is not limited to the following several manners:

Manner 1: If an area identifier (ID) received by the IAB node is inconsistent with a locally stored area ID, the IAB node moves out of the target area.

Manner 2: If an ID of a cell in which the IAB node is currently located is not in a received cell list, the IAB node moves out of the target area.

Manner 3: If a donor base station corresponding to a node currently connected to the IAB node is not in a received donor base station list, the IAB node moves out of the target area.

It should be understood that only three manners of determining whether the IAB node moves out of the target area are listed above. Whether the IAB node moves out of the target area may be determined based on any one of the foregoing listed manners, to further determine an occasion on which the DU of the IAB node uses the new configuration information.

In a possible implementation, when N is greater than 1, the DU of the IAB node may use one piece of configuration information in the N pieces of configuration information of the DU based on, for example, the following several rules:

Rule 1: Randomly select one piece of configuration information from the N pieces of configuration information of the DU. This is simple, and complexity of the DU can be reduced.

Rule 2: Select, from the N pieces of configuration information of the DU, configuration information that is of the DU and that corresponds to a first target serving node, where the first target serving node is the first target donor base station in the N target donor base stations, or the first target serving node is an IAB node connected to the first target donor base station in the N target donor base stations. The first target serving node may be a node that sends a reference signal having maximum strength, to ensure, as much as possible, communication quality of a handed over backhaul link of the IAB node. The first target serving node may be alternatively a node whose operating frequency band is the same as an operating frequency band of the source donor base station, so that complexity of reconfiguring a resource of the MT of the IAB node and a resource of the DU of the IAB node can be reduced, and impact on the terminal can be reduced. The first target serving node may be alternatively a node or the like of which a random access occasion (RACH occasion) of a physical random access channel (PRACH) arrives the earliest. In this way, the MT of the IAB node can initiate random access earlier, and impact caused by link communication quality deterioration or a link exception can be reduced.

In a possible implementation, the configuration information of the DU includes a first set of PRACH resource configurations and a second set of PRACH resource configurations, that is, two sets of PRACH resource configurations. The first set of PRACH resource configurations is used by a terminal to initiate random access, and the second set of PRACH resource configurations is used by a child IAB node to initiate random access to the DU. Existence of the second set of PRACH resource configurations can avoid a case in which an MT of the child IAB node cannot send a random access request because the child IAB node receives a random access request of the terminal.

In a possible implementation, the second set of PRACH resource configurations includes one or more of the following configurations:

a ZC root sequence index, a PRACH configuration index, a periodicity scaling factor, a quantity of RACH occasions (ROs) that is associated with each synchronization signal block (SSB), or an offset configuration for a slot/subframe having an RACH occasion, where the periodicity scaling factor and the PRACH configuration index are used to determine a period of a PRACH resource. In this solution, the PRACH resource configuration used by the IAB node to initiate random access may include the periodicity scaling factor, and the periodicity scaling factor and the PRACH configuration index may be used together to determine the period of the PRACH resource. This facilitates compatibility with a PRACH resource configuration in an existing implementation.

In a possible implementation, the configuration information of the MT may further include one or more of the following information:
   backhaul adaptation protocol (BAP) layer configuration information;
   data bearer mapping information of the MT; or
   quality of service configuration information of the MT.

In a possible implementation, the method further includes:

The MT of the IAB node receives second configuration information from the source donor base station, where the second configuration information is P pieces of configuration information configured by the DU of the IAB node for P terminals, each piece of configuration information corresponds to one terminal identifier, and P is greater than or equal to 1. That is, the IAB node prestores the configuration information of the P terminals. In this way, when the MT of the IAB node performs handover of a parent node of a backhaul link, the DU of the IAB node sends the configuration information to the P terminals. This can reduce a handover delay of the terminal.

According to a second aspect, another communication method is provided. The method may be performed by a second communication apparatus. The second communication apparatus may be a communication device or a communication apparatus, for example, a chip system, that can support the communication device in implementing a function required in the method. The following provides descriptions by using an example in which the communication device is a source donor base station. The method includes:

The source donor base station sends a configuration request message to N target donor base stations, and the source donor node receives configuration information sent by the N target donor base stations, where the configuration request message includes identification information of an IAB node and one or more pieces of cell information of the IAB node, and N is greater than or equal to 1; and configuration information sent by each target donor base station includes configuration information of an MT and configuration information of a DU that are configured by the target donor base station for the IAB node, the MT is configured to communicate with a parent node of the IAB node or the source donor base station, and the DU is configured to communicate with a child node of the IAB node or a terminal. Because the DU of the IAB node may have one or more cells, the configuration request message includes one or more pieces of cell information of the IAB node, for example, physical cell identifiers (PCIs). This is equivalent to notifying the N target donor base stations in advance of PCIs used by the DU of the IAB node, so that the N target donor base stations generate the configuration information of the DU and the like based on the PCI. This can avoid a potential resource conflict caused because the DU of the IAB node still uses an original configuration after the MT of the IAB node completes access.

In a possible implementation, the configuration request message further includes results of measuring synchronization signal blocks SSBs of a plurality of target donor base stations by the MT of the IAB node.

In a possible implementation, the configuration request message further includes at least one of cell information of the DU of the IAB node, a PRACH resource configuration, and synchronization signal configuration information.

For technical effects brought by the second aspect or the possible implementations of the second aspect, refer to the descriptions of the technical effects brought by the first aspect or the possible implementations of the first aspect.

According to a third aspect, still another communication method is provided. The method may be performed by a third communication apparatus. The third communication apparatus may be a communication device or a communication apparatus, for example, a chip system, that can support the communication device in implementing a function required in the method. The following provides descriptions by using an example in which the communication device is a target donor base station. The method includes:

The target donor base station receives a configuration request message from a source donor base station, and sends configuration information to the source donor base station, where the configuration request message includes identification information of an IAB node and one or more pieces of cell information of the IAB node, and N is greater than or equal to 1; and the configuration information includes configuration information of an MT and configuration information of a DU that are configured by the target donor base station for the IAB node, the MT is configured to communicate with a parent node of the IAB node or the source donor base station, and the DU is configured to communicate with a child node of the IAB node or a terminal.

In a possible implementation, the configuration information of the DU includes a first set of PRACH resource configurations and a second set of PRACH resource configurations, the first set of PRACH resource configurations is used by a terminal to initiate random access, and the second set of PRACH resource configurations is used by an IAB node to initiate random access. Existence of the second set of PRACH resource configurations can avoid a case in which an MT of a child IAB node cannot send a random access request because the child IAB node receives a random access request of the terminal.

In a possible implementation, the second set of PRACH resource configurations includes one or more of the following configurations:
   a ZC root sequence index, a PRACH configuration index, a periodicity scaling factor, a quantity of RACH occasions that is associated with each synchronization signal block (SSB), or an offset configuration for a slot/subframe having an RACH occasion, where the periodicity scaling factor and the PRACH configuration index are used to determine a period of a PRACH resource. This implementation facilitates compatibility with a PRACH resource configuration in an existing implementation.

In a possible implementation, the method further includes: The target donor base station sends a specific condition to the source donor base station, where the specific condition may include one or more of the following conditions:
   Condition 1: A result of measuring a first signal by the MT of the IAB node is less than a first preset threshold, where the first signal is sent by the parent node currently connected to the IAB node or the source donor base station.

Condition 2: A result of measuring a second signal by the MT of the IAB node is greater than a second preset threshold, where the second signal is not sent by the parent node currently connected to the IAB node or the source donor base station.

Condition 3: A beam failure occurs on the MT of the IAB node on a first carrier link, where the first carrier link is a communication link between the IAB node and the parent node currently connected to the IAB node or the source donor base station.

Condition 4: A radio link failure occurs on the MT of the IAB node on a second carrier link, where the second carrier link is a communication link between the IAB node and the parent node currently connected to the IAB node or the source donor base station.

Condition 5: a duration accumulated since the MT of the IAB node receives the configuration information from the source donor base station satisfies a preset duration.

Condition 6: The MT of the IAB node starts or completes a random access process.

Condition 7: The MT of the IAB node receives first signaling from the source donor base station, where the first signaling is used to indicate the IAB node to hand over to a first target donor base station.

Condition 8: an area ID, a cell list, or a donor base station list. It should be understood that the eighth specific condition is used by the IAB node to determine whether to move out of the target area.

For specific technical effects brought by this implementation, refer to the descriptions of the technical effects of the implementations of the first aspect. Details are not described herein again.

For technical effects brought by the third aspect or the possible implementations of the third aspect, refer to the descriptions of the technical effects brought by the first aspect or the possible implementations of the first aspect.

According to a fourth aspect, an embodiment of this application provides a communication apparatus. The communication apparatus has a function of implementing behavior of the method embodiment in the first aspect. The function may be implemented by hardware, or may be implemented by hardware executing corresponding software. The hardware or the software includes one or more modules corresponding to the foregoing function. In a possible implementation, the communication apparatus includes a transceiver unit and a processing unit.

The transceiver unit is configured to receive first configuration information from a source donor base station, where the first configuration information includes N pieces of configuration information of an MT and N pieces of configuration information of a DU that are configured by N target donor base stations for the communication apparatus, N is greater than or equal to 1, the MT is configured to communicate with a parent node of the communication apparatus, the source donor base station, or the target donor base station, and the DU is configured to communicate with a child node of the communication apparatus or a terminal.

The processing unit is configured to be used by the DU of the communication apparatus to use one piece of configuration information in the N pieces of configuration information of the DU when the MT of the communication apparatus satisfies a specific condition.

In a possible implementation, the specific condition includes the following:
a result of measuring a first signal by the MT of the communication apparatus is less than a first preset threshold, where the first signal is sent by the parent node currently connected to the communication apparatus or the source donor base station;

a result of measuring a second signal by the MT of the communication apparatus is greater than a second preset threshold, where the second signal is not sent by the parent node currently connected to the communication apparatus or the source donor base station;

a beam failure occurs on the MT of the communication apparatus on a first carrier link, where the first carrier link is a communication link between the communication apparatus and the parent node currently connected to the communication apparatus or the source donor base station;

a radio link failure occurs on the MT of the communication apparatus on a second carrier link, where the second carrier link is a communication link between the communication apparatus and the parent node currently connected to the communication apparatus or the source donor base station;

a duration accumulated since the MT of the communication apparatus receives the configuration information from the source donor base station satisfies a preset duration;

the MT of the communication apparatus starts or completes a random access process;

the MT of the communication apparatus receives first signaling from the source donor base station, where the first signaling is used to indicate the communication apparatus to hand over to a first target donor base station; or the communication apparatus moves out of a target area.

In a possible implementation, that the communication apparatus moves out of a target area includes the following:
an area identifier (ID) received by the communication apparatus is inconsistent with a locally stored area ID;

an ID of a cell in which the communication apparatus is currently located is not in a received cell list; or a donor base station corresponding to a node currently connected to the communication apparatus is not in a received donor base station list.

In a possible implementation, that the DU of the communication apparatus uses one piece of configuration information in the N pieces of configuration information of the DU when N is greater than 1 includes:

randomly selecting one piece of configuration information from the N pieces of configuration information of the DU; or selecting, from the N pieces of configuration information of the DU, configuration information that is of the DU and that corresponds to a first target serving node, where the first target serving node is the first target donor base station in the N target donor base stations, or the first target serving node is an IAB node connected to the first target donor base station in the N target donor base stations, where a reference signal sent by the first target serving node has maximum strength;

an operating band of the first target serving node is the same as that of the source donor base station; or a random access occasion of a PRACH resource of the first target serving node arrives the earliest.

In a possible implementation, the configuration information of the DU includes a first set of PRACH resource configurations and a second set of PRACH resource configurations, the first set of PRACH resource configurations is used by a terminal to initiate random access, and the second set of PRACH resource configurations is used by an IAB node to initiate random access.

In a possible implementation, the second set of PRACH resource configurations includes one or more of the following configurations:

A ZC root sequence index, a PRACH configuration index, a periodicity scaling factor, a subframe or slot offset, or a quantity of RACH occasions that is associated with each synchronization signal block (SSB), where the periodicity scaling factor and the PRACH configuration index are used to determine a period of a PRACH resource.

In a possible implementation, the configuration information of the MT may further include one or more of the following information:

backhaul adaptation protocol (BAP) layer configuration information;

data bearer mapping information of the MT; or quality of service configuration information of the MT.

In a possible implementation, the transceiver unit is further configured to:

receive second configuration information from the source donor base station, where the second configuration information is P pieces of configuration information configured by the DU of the communication apparatus for P terminals, each piece of configuration information corresponds to one terminal identifier, and P is greater than or equal to 1.

For technical effects brought by the fourth aspect or the possible implementations of the fourth aspect, refer to the descriptions of the technical effects brought by the first aspect or the possible implementations of the first aspect.

According to a fifth aspect, an embodiment of this application provides another communication apparatus. The communication apparatus has a function of implementing behavior of the method embodiment in the second aspect. The function may be implemented by hardware, or may be implemented by hardware executing corresponding software. The hardware or the software includes one or more modules corresponding to the foregoing function. In a possible implementation, the communication apparatus includes a sending unit and a receiving unit.

The sending unit is configured to send a configuration request message to N target donor base stations, where the configuration request message includes identification information of an IAB node and one or more pieces of cell information of the IAB node, and N is greater than or equal to 1.

The receiving unit is configured to receive configuration information sent by the N target donor base stations, where configuration information sent by each target donor base station includes configuration information of an MT and configuration information of a DU that are configured by the target donor base station for the IAB node, the MT is configured to communicate with a parent node of the IAB node or the communication apparatus, and the DU is configured to communicate with a child node of the IAB node or a terminal.

In a possible implementation, the configuration request message further includes results of measuring synchronization signal blocks SSBs of a plurality of target donor base stations by the MT of the IAB node.

In a possible implementation, the configuration request message further includes at least one of cell information of the DU of the IAB node, a physical random access channel (PRACH) resource configuration, and synchronization signal configuration information.

For technical effects brought by the fifth aspect or the possible implementations of the fifth aspect, refer to the descriptions of the technical effects brought by the second aspect or the possible implementations of the second aspect.

According to a sixth aspect, an embodiment of this application provides still another communication apparatus. The communication apparatus has a function of implementing behavior of the method embodiment in the third aspect. The function may be implemented by hardware, or may be implemented by hardware executing corresponding software. The hardware or the software includes one or more modules corresponding to the foregoing function. In a possible implementation, the communication apparatus includes a sending unit and a receiving unit.

The receiving unit is configured to receive a configuration request message from a source donor base station, where the configuration request message includes identification information of an IAB node and one or more pieces of cell information of the IAB node, and N is greater than or equal to 1.

The sending unit is configured to send configuration information to the source donor base station, where the configuration information includes configuration information of an MT and configuration information of a DU that are configured by the communication apparatus for the IAB node, the MT is configured to communicate with a parent node of the IAB node or the source donor base station, and the DU is configured to communicate with a child node of the IAB node or a terminal.

In a possible implementation, the configuration information of the DU includes a first set of PRACH resource configurations and a second set of PRACH resource configurations, the first set of PRACH resource configurations is used by a terminal to initiate random access, and the second set of PRACH resource configurations is used by an IAB node to initiate random access.

In a possible implementation, the second set of PRACH resource configurations includes one or more of the following configurations:

a ZC root sequence index, a PRACH configuration index, a periodicity scaling factor, a subframe or slot offset, or a quantity of RACH occasions that is associated with each synchronization signal block (SSB), where the periodicity scaling factor and the PRACH configuration index are used to determine a period of a PRACH resource.

In a possible implementation, the sending unit is further configured to send a specific condition to the source donor base station, where the specific condition includes the following:

a result of measuring a first signal by the MT of the IAB node is less than a first preset threshold, where the first signal is sent by a current serving node of the IAB node;

a result of measuring a second signal by the MT of the IAB node is greater than a second preset threshold, where the second signal is not sent by a current serving node of the IAB node;

a beam failure occurs on the MT of the IAB node on a first carrier link, where the first carrier link is a communication link between the IAB node and a current serving node of the IAB node;

a radio link failure occurs on the MT of the IAB node on a first carrier link, where the first carrier link is a communication link between the IAB node and a current serving node of the IAB node;

a duration accumulated since the MT of the IAB node receives the configuration information from the source donor base station satisfies a preset duration;

the MT of the IAB node starts or completes a random access process;

the MT of the IAB node receives first signaling from the source donor base station, where the first signaling is used to indicate the IAB node to hand over to a first target donor base station; or an area identifier (ID);

a cell list; or a donor base station list.

For technical effects brought by the sixth aspect or the possible implementations of the sixth aspect, refer to the descriptions of the technical effects brought by the third aspect or the possible implementations of the third aspect.

According to a seventh aspect, an embodiment of this application provides a communication apparatus. The communication apparatus may be the communication apparatus in the fourth aspect, the fifth aspect, or the sixth aspect in the foregoing embodiments, or a chip disposed in the communication apparatus in the fourth aspect, the fifth aspect, or the sixth aspect. The communication apparatus includes a communication interface and a processor; and optionally, further includes a memory. The memory is configured to store a computer program, instructions, or data. The processor is coupled to the memory and the communication interface. When the processor reads the computer program, the instructions, or the data, the communication apparatus performs the method performed by the IAB node, the source donor base station, or the target donor base station in the foregoing method embodiments.

It should be understood that the communication interface may be a transceiver in the communication apparatus, and is implemented, for example, by using an antenna, a feeder, and a codec in the communication apparatus. Alternatively, if the communication apparatus is a chip disposed in a network device, the communication interface may be an input/output interface of the chip, for example, an input/output pin. The transceiver is used by the communication apparatus to communicate with another device. For example, when the communication apparatus is the IAB node, the another device is the source donor base station and the target donor base station; when the communication apparatus is the source donor base station, the another device is the IAB node and the target donor base station; or when the communication apparatus is the target donor base station, the another device is the IAB node and the source donor base station.

According to an eighth aspect, an embodiment of this application provides a chip system. The chip system includes a processor, may further include a memory, and is configured to implement the method performed by the communication apparatus in the fourth aspect, the fifth aspect, or the sixth aspect. In a possible implementation, the chip system further includes the memory, configured to store program instructions and/or data. The chip system may include a chip, or may include a chip and another discrete device.

According to a ninth aspect, an embodiment of this application provides a communication system. The communication system includes the communication apparatus according to the fourth aspect, the communication apparatus according to the fifth aspect, and the communication apparatus according to the sixth aspect.

According to a tenth aspect, this application provides a computer-readable storage medium. The computer-readable storage medium stores a computer program. When the computer program is run, the method performed by the IAB node in the foregoing aspects is implemented, the method performed by the source donor base station in the foregoing aspects is implemented, or the method performed by the target donor base station in the foregoing aspects is implemented.

According to an eleventh aspect, a computer program product is provided. The computer program product includes computer program code. When the computer program code is run, the method performed by the IAB node in the foregoing aspects is implemented, the method performed by the source donor base station in the foregoing aspects is implemented, or the method performed by the target donor base station in the foregoing aspects is implemented.

For beneficial effects of the seventh aspect to the eleventh aspect and the implementations thereof, refer to the descriptions of the beneficial effects of the method according to the first aspect, the second aspect, or the third aspect and the implementations thereof.

In the methods provided in this embodiment of this application, the DU of the IAB node uses a piece of configuration information that is of the DU and that is configured by the target donor base station for the IAB node, only when the MT of the IAB node satisfies the specific condition. Because the DU of the IAB node uses new configuration information provided that the MT satisfies the specific condition, in a process of implementing cross-donor base station handover of the IAB node, a conflict between a resource for the DU of the IAB node to send, for example, a synchronization signal block (SSB) and a resource for the MT of the IAB node to send an SSB can be avoided, thereby avoiding a communication exception of a terminal as much as possible. In addition, in the method, the IAB node prestores configuration information of P terminals. In this way, when the MT of the IAB node performs handover of a parent node of a backhaul link, the DU of the IAB node sends the configuration information to the P terminals. This can reduce a handover delay of the terminal.

DESCRIPTION OF EMBODIMENTS

To make objectives, technical solutions and advantages of embodiments of this application clearer, the following further describes embodiments of this application in detail with reference to the accompanying drawings.

Before this application is described, some terms of embodiments of this application are first briefly explained and described, to help a person skilled in the art have a better understanding.

To improve spectrum utilization, base stations will be deployed more densely in the future. However, because deployment costs of an optical fiber are high, a connection to a core network is established through a backhaul link of a wireless relay node (RN), so that some deployment costs of the optical fiber can be saved.

A relay node may establish a wireless backhaul link to one or more parent nodes, and access the core network through one of the one or more parent nodes. The parent node may perform control (for example, data scheduling, timing modulation, and power control) on the relay node by using a plurality of types of signaling. In addition, the relay node may establish an access link to one or more child nodes, and provide a service for the one or more child nodes. The parent node of the relay node may be a base station, or may be another relay node. The child node of the relay node may be a terminal, or may be another relay node. In some cases, the parent node may also be referred to as an upstream node, and the child node may also be referred to as a downstream node.

To improve the spectrum utilization, the backhaul link and the access link may share a same frequency band. This solution is also referred to as an in-band relay. The in-band relay usually has a half-duplex constraint. To be specific, when receiving a downlink signal sent by the parent node of the relay node, the relay node cannot send a downlink signal to the child node of the relay node, and when receiving an uplink signal sent by the child node of the relay node, the relay node cannot send an uplink signal to the parent node of the relay node. An in-band relay solution of a new generation wireless communication system (new radio, NR) is referred to as IAB, and correspondingly, the relay node is referred to as an IAB node. When the IAB node operates normally, resource multiplexing is performed on the access link and the backhaul link in a time division manner, a space division manner, or a frequency division manner.

Figure 1:
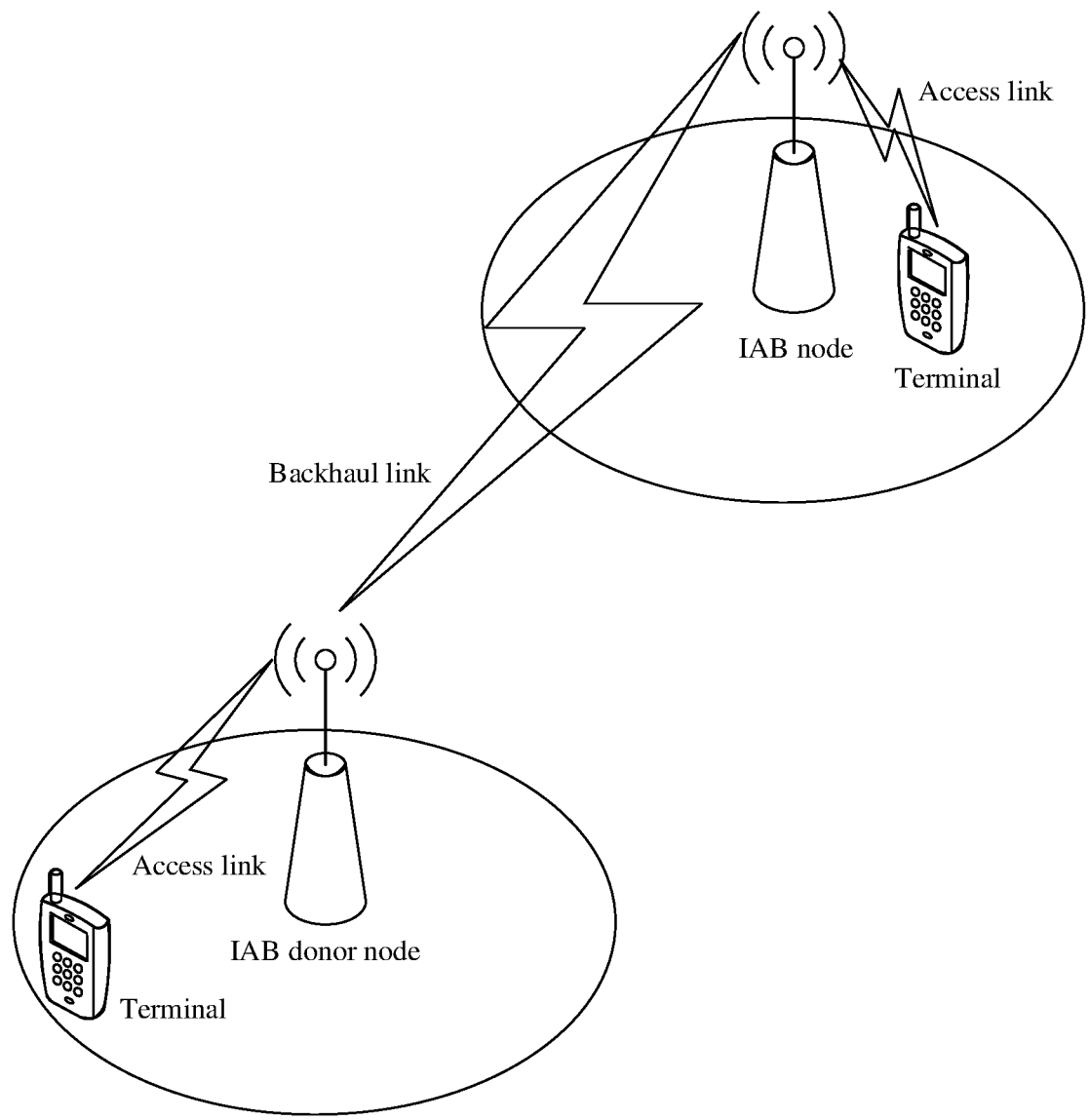
FIG. 1 is a schematic diagram of a structure of an IAB system according to an embodiment of this application.

FIG. 1 shows an IAB system. An IAB node provides wireless access and wireless backhaul that is of an access service for a terminal. An IAB donor node provides a wireless backhaul function for the IAB node and provides an interface between the terminal and a core network. The IAB node is connected to the IAB donor node through a wireless backhaul link, so that the terminal served by the IAB node is connected to the core network.

Figure 2:
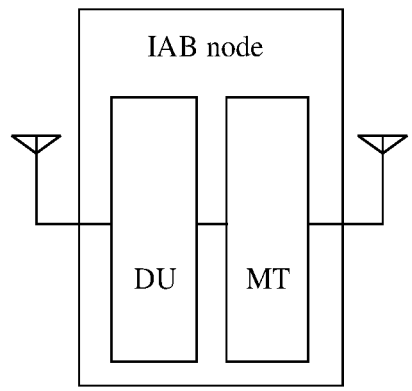
FIG. 2 is a schematic diagram of a structure of an IAB node according to an embodiment of this application.
Figure 3:
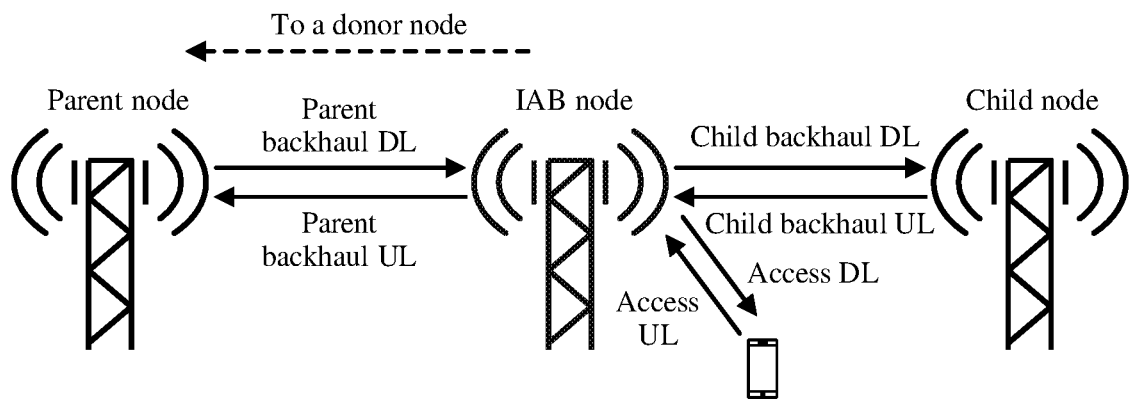
FIG. 3 is a schematic diagram of a backhaul link and an access link according to an embodiment of this application.

FIG. 2 is a schematic diagram of a structure of an IAB node. The IAB node in NR may be divided into a mobile terminal (MT) and a distributed unit (DU). The MT may alternatively be understood as a component that is similar to a terminal and that is in IAB, and the MT is referred to as a function camping on the IAB node. Because a function of the MT is similar to that of an ordinary terminal, it may be understood that the MT is used by the IAB node to communicate with a parent node. The DU is relative to a function of a centralized unit (CU) of a network device, and the DU is used by the IAB node to communicate with a child node. It should be understood that the parent node may be a base station or another IAB node, and the child node may be a terminal or another IAB node. A link for communication between the MT and the parent node is referred to as a parent backhaul link, a link for communication between the DU and the child IAB node is referred to as a child backhaul link, and a link for communication between the DU and a subordinate terminal is referred to as an access link. In some embodiments, the child backhaul link is also referred to as an access link. The parent backhaul link includes a parent backhaul uplink (UL) and a parent backhaul downlink (DL), the child backhaul link includes a child backhaul UL and a child backhaul DL, and the access link includes an access UL and an access DL, as shown in FIG. 3.

Figure 4:
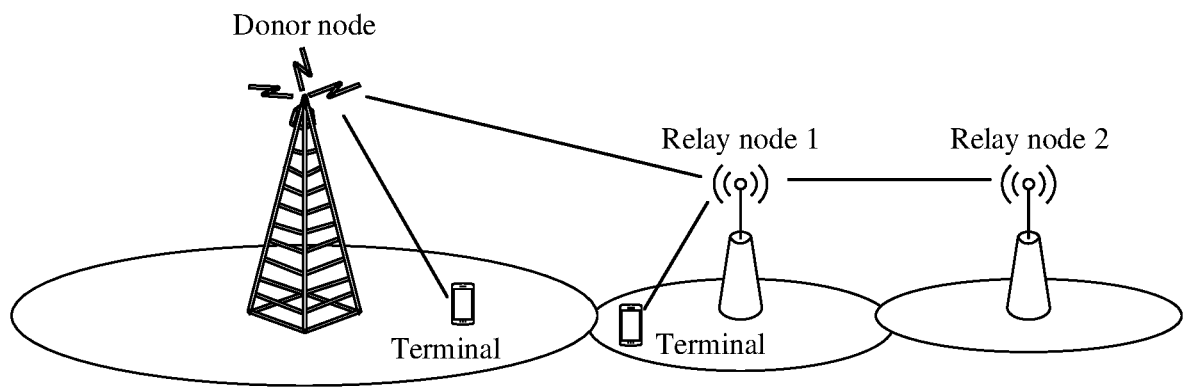
FIG. 4 is a schematic diagram of an architecture of an example of an applicable communication system according to an embodiment of this application.

A communication method provided in embodiments of this application may be applied to a wireless communication system having a relay node, as shown in FIG. 4. It should be understood that FIG. 4 is merely an example for description, and quantities of terminals and relay nodes included in the wireless communication system are not specifically limited. In LTE, the relay node is generally referred to as an RN. In NR, the relay node is generally referred to as an IAB node. In some embodiments, the relay node may also be referred to as a relay device or a relay transmission reception point (rTRP), and a parent node of the relay node may be a network device (including a DU of the network device, a CU of the network device, or the like).

Figure 5:
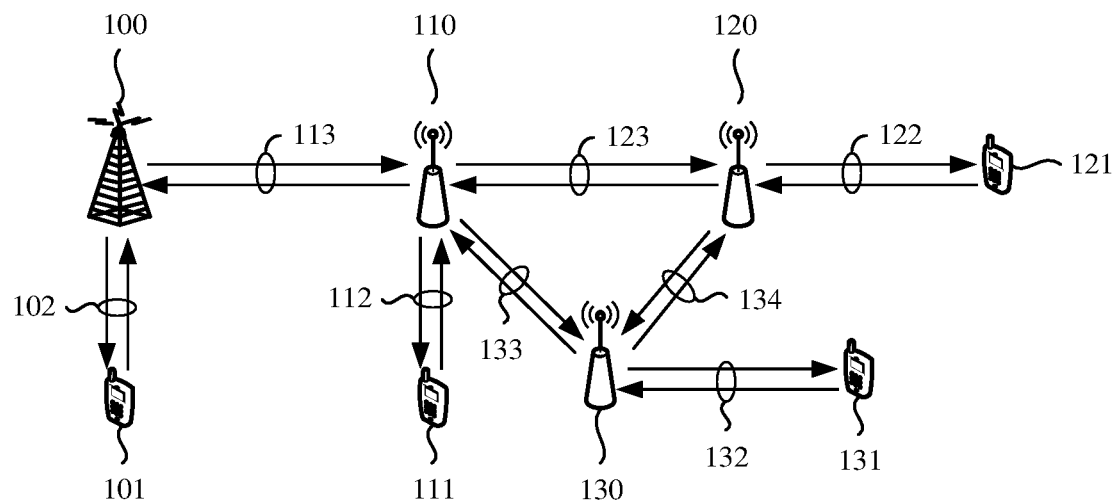
FIG. 5 is a schematic diagram of an architecture of an example of another applicable communication system according to an embodiment of this application.

FIG. 5 is a schematic diagram of a structure of an IAB system in an NR scenario. The IAB system shown in FIG. 5 includes at least one base station 100, one or more terminals served by the base station 100, one or more IAB nodes, and one or more terminals served by the IAB nodes. The IAB node includes an IAB node 110, an IAB node 120, and an IAB node 130. The base station 100 is generally referred to as a donor base station (donor next generation NodeB, DgNB). The IAB node 110 is connected to the base station 100 through a wireless backhaul link 113. The IAB node 120 is connected to the IAB node 110 through a wireless backhaul link 123 to access a network. The IAB node 130 is connected to the IAB node 110 through a wireless backhaul link 133 to access the network. The IAB node 110 serves one or more terminals 111, the IAB node 120 serves one or more terminals 121, and the IAB node 130 serves one or more terminals 131. It should be noted that, in embodiments of this application, the wireless backhaul link is viewed from a perspective of the IAB node. For example, the wireless backhaul link 113 is a backhaul link of the IAB node 110, and the wireless backhaul link 123 is a backhaul link of the IAB node 120. As shown in FIG. 5, one IAB node (for example, the IAB node 120) may be connected to another IAB node 110 through a wireless backhaul link (for example, the wireless backhaul link 123), to access the network. In addition, the IAB node may be connected to the network by using a plurality of levels of wireless IAB nodes.

It should be understood that, in embodiments of this application, the IAB node is used only for a purpose of description, and does not indicate that the solutions in embodiments of this application are used only in an NR scenario. In embodiments of this application, the IAB node may be any node or device having a relay function. It should be understood that use of the IAB node and use of the relay node in embodiments of this application have a same meaning.

Usually, a node that provides a resource of a wireless backhaul link, for example, the IAB node 110, is referred to as a parent node of the IAB node 120, and the IAB node 120 is referred to as a child node of the IAB node 110. Usually, a child node may be considered as a terminal of a parent node. It should be understood that, in the IAB system shown in FIG. 5, one IAB node is connected to one parent node. However, in a future relay system, to improve reliability of a wireless backhaul link, a plurality of parent nodes may simultaneously provide a serve for one IAB node (for example, the IAB node 120). For example, the IAB node 130 in FIG. 5 may be further connected to the IAB node 120 through a backhaul link 134, that is, both the IAB node 110 and the IAB node 120 are parent nodes of the IAB node 130.

In addition, the wireless backhaul links 102, 112, 122, 132, 113, 123, 133, and 134 may be bidirectional links, including uplink and downlink transmission links. Particularly, the wireless backhaul links 113, 123, 133, and 134 may be used by a parent node to provide a service for a child node. For example, the parent node 100 provides a wireless backhaul service for the child node 110. It should be understood that an uplink and a downlink of a backhaul link may be separated, that is, transmission through an uplink and transmission through a downlink are not via a same node. Downlink transmission means that a parent node transmits information or data to a child node. For example, the node 100 transmits information or data to the node 110. Uplink transmission means that a child node transmits information or data to a parent node. For example, the node 110 transmits information or data to the node 100. The node is not limited to a network node or a terminal. For example, in a D2D scenario, a terminal may be used as a relay node to serve another terminal. In some scenarios, a wireless backhaul link may also be an access link. For example, the wireless backhaul link 123 may also be considered as an access link for the node 110, and the wireless backhaul link 113 is also an access link for the node 100. It should be understood that the parent node may be a base station or a relay node, and the child node may be a relay node or a terminal having a relay function. For example, in the D2D scenario, the child node may also be a terminal.

It should be noted that a donor node is a node that can access a core network, or a network device of a radio access network. For example, the donor node is an anchor base station (or the donor base station or the donor node mentioned above), and the anchor base station can access a network. The anchor base station is responsible for processing data at a packet data convergence protocol (PDCP) layer, receiving data from a core network and forwarding the data to a relay node, or receiving data from a relay node and forwarding the data to a core network. The donor node may generally access the network in a wired manner, for example, through an optical fiber.

The network device may be referred to as a base station, or may be referred to as a radio access network (RAN) node (or device). For example, the network device may be a next-generation NodeB (gNB), a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In embodiments of this application, a name of the network device may be a relay node (RN), a relay transmission reception point (rTRP), an IAB node, or the like; and the parent node of the relay node may be a gNB (including a gNB-DU, a gNB-CU, and the like), or may be another relay node.

Figure 6:
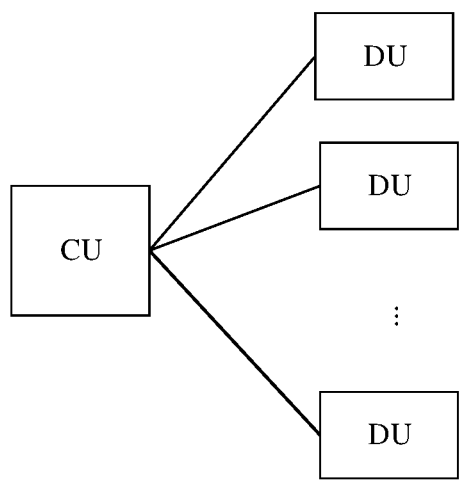
FIG. 6 is a schematic diagram of a structure of a network device according to an embodiment of this application.

For example, a structure of the network device in embodiments of this application may be shown in FIG. 6. Specifically, the network device may be divided into a CU and at least one DU. The CU may be configured to manage or control the at least one DU, which may also be referred to as that the CU is connected to the at least one DU. In this structure, protocol layers of the network device in a communication system may be separated, a part of the protocol layers is controlled by the CU in a centralized manner, and functions of a part or all of remaining protocol layers are distributed in the DU. The CU controls the DU in a centralized manner. For example, the network device is a gNB. Protocol layers of the gNB include a radio resource control (RRC) layer, a service data adaptation protocol (SDAP) layer, a packet data convergence protocol (PDCP) layer, a radio link control (RLC) layer, a media access control sublayer (MAC) layer, and a physical layer (PHY). For example, the CU may be configured to implement functions of the RRC layer, the SDAP layer, and the PDCP layer, and the DU may be configured to implement functions of the RLC layer, the MAC layer, and the physical layer. Physically, the CU and the DU may be connected through an optical fiber. Logically, there is a specifically defined F1 interface used for communication between the CU and the DU. From a function perspective, the CU is mainly responsible for radio resource control and configuration, cross-cell mobility management, bearer management, and the like, and the DU is mainly responsible for scheduling and physical signal generation and sending. Protocol stacks included in the CU and the DU are not specifically limited in embodiments of this application.

Figure 7:
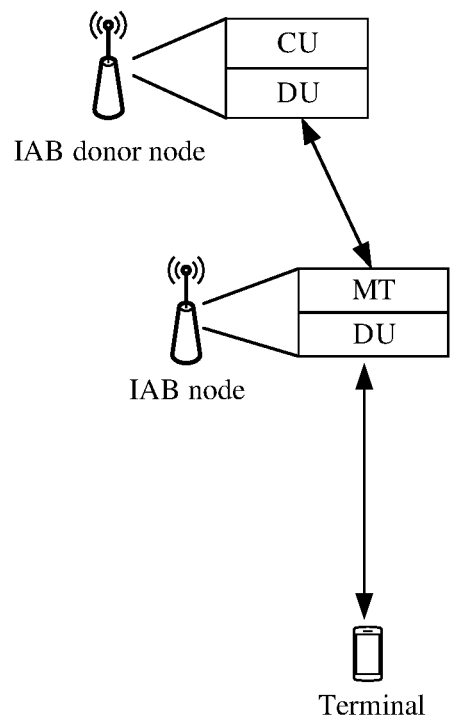
FIG. 7 is a schematic diagram of communication of an IAB node according to an embodiment of this application.

If the network device is a relay device, especially an IAB node, the network device may include a function of an MT and a function of a DU. To be specific, the IAB node communicates with a parent node by using the MT, and the DU is a base station function module of the IAB node, is configured to implement functions of the RLC layer, the MAC layer, and the physical layer, and is mainly responsible for scheduling and physical signal generation and sending. That is, the IAB node communicates with a child node and a terminal by using the DU, as shown in FIG. 7. Both the MT and the DU of the IAB node have complete transceiver modules, and there is an interface between the MT and the DU. However, it should be noted that the MT and the DU are logical modules. In practice, the MT and the DU may share some sub-modules, for example, may share a transceiver antenna and a baseband processing module, as shown in FIG. 7.

The terminal in embodiments of this application is an entity that is on a user side and that is configured to receive or transmit a signal. The terminal may be a device that provides voice and/or data connectivity for a user, for example, may be a handheld device having a wireless connection function, or a processing device connected to a wireless modem. The terminal device may communicate with a core network by using a radio access network (RAN), and exchange voice and/or data with the RAN. The terminal device may include user equipment (UE), a wireless terminal device, a mobile terminal device, a device-to-device (D2D) communication terminal device, a vehicle-to-everything (V2X) terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, pocket-sized, hand-held, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capacity, or a device with a limited computing capability. For example, the terminal device includes an information sensing device such as a barcode, radio frequency identification (RFID), a sensor, a global positioning system (GPS), or a laser scanner.

By way of example and not limitation, in embodiments of this application, the terminal device may alternatively be a wearable device. The wearable device may also be referred to as a wearable intelligent device, an intelligent wearable device, or the like, and is a generic term for wearable devices that are developed by applying a wearable technology to intelligent implementations of daily wear, for example, glasses, gloves, watches, clothes, and shoes. The wearable device is a portable device that can be directly worn by a user or integrated into clothes or an accessory of a user. The wearable device is not merely a hardware device, but is used to implement a powerful function through software support, data exchange, and cloud interaction. In a broad sense, wearable intelligent devices include full-featured and large-sized devices that can implement all or some functions without depending on smartphones, for example, smart watches or smart glasses, and include devices that focus only on one type of application function and that need to collaboratively work with other devices such as smartphones, for example, various smart bands, smart helmets, or smart jewelry for monitoring physical signs.

However, if the various terminals described above are located on a vehicle (for example, placed in the vehicle or installed in the vehicle), the terminals may all be considered as vehicle-mounted terminal devices. For example, the vehicle-mounted terminal devices are also referred to as on-board units (OBUs).

Figure 8:
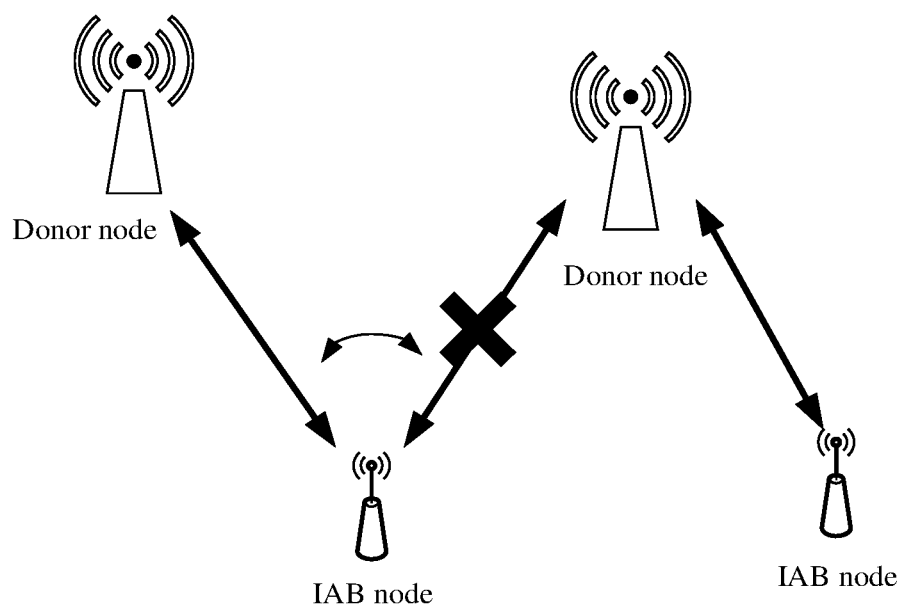
FIG. 8 is a schematic diagram of cross-donor node migration of an IAB node according to an embodiment of this application.
Figure 9:
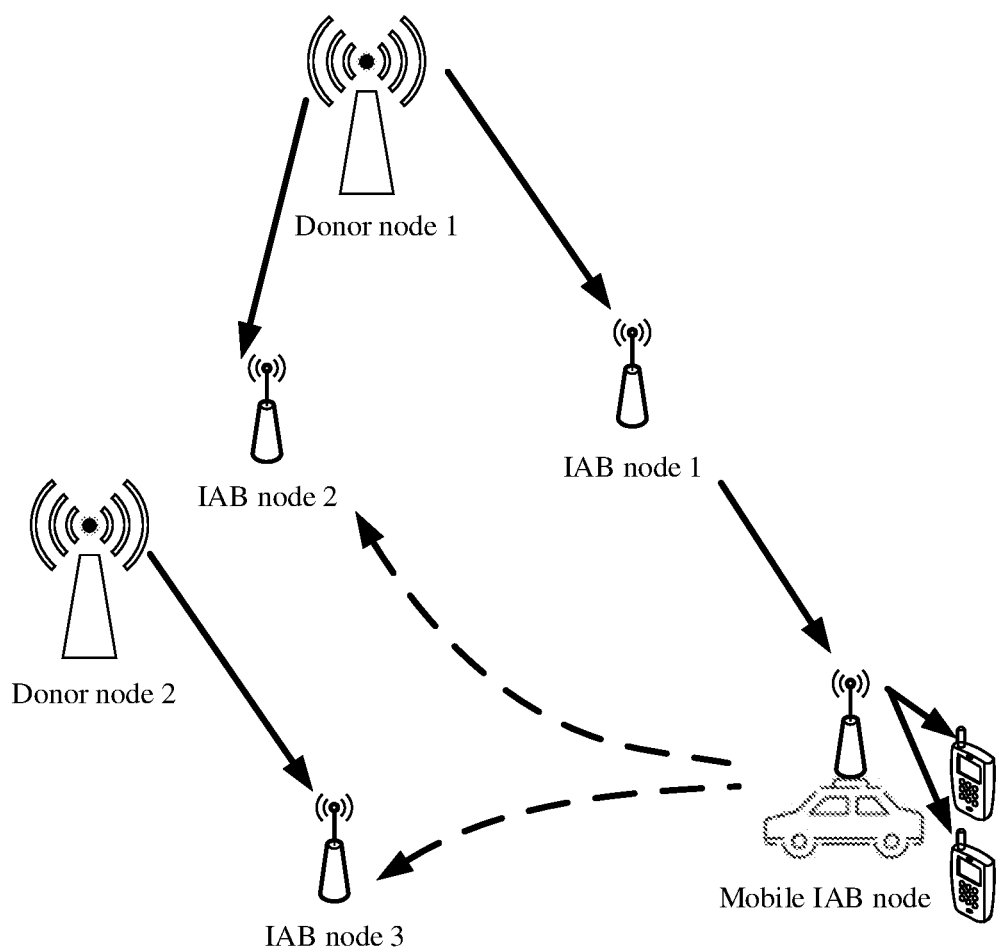
FIG. 9 is a schematic diagram of an application scenario of a mobile IAB node according to an embodiment of this application.

In a possible application scenario, FIG. 8 is a schematic diagram of cross-donor node migration of an IAB node. If a backhaul link between the IAB node and a parent node (that is, a donor node) directly connected to the IAB node is interrupted or communication quality of the backhaul link deteriorates, to ensure the communication quality of the backhaul link of the IAB node, the backhaul link of the IAB node may be migrated to another parent node. For example, the backhaul link of the IAB node may be migrated to another candidate parent node, a potential node, or a neighboring node. If the parent node is another donor node or a child IAB node connected to the another donor node, and it is considered that the IAB node has mobility in future communication, as shown in FIG. 9, another possible application scenario, that is, an application scenario of a mobile IAB node, is provided. In FIG. 9, for example, two donor nodes (which are respectively a donor node 1 and a donor node 2) and one mobile IAB node are included. It should be understood that, because the IAB node moves, the IAB node may leave a coverage range of a donor node that currently serves the IAB node. For example, the IAB node may move from a location of an IAB node 1 to a location of an IAB node 2, or may move to a location of an IAB node 3. It can be seen that, when the IAB node moves from the location of the IAB node 1 to the location of the IAB node 3, the IAB node is not in a coverage range of the donor node 1. To ensure communication quality of a backhaul link of the IAB node, the backhaul link of the IAB node may be migrated to another parent node. It should be understood that the mobile IAB node may move to the location of the IAB node 2, or may move to the location of the IAB node 3. Therefore, in FIG. 9, dashed lines are used to indicate that the mobile IAB node may move to the locations of the IAB node 2 and the IAB node 3.

Both the application scenario shown in FIG. 8 and the application scenario shown in FIG. 9 relate to migration of the IAB node. IAB includes an MT and a DU. For the MT, a migration mechanism of a terminal may be followed, that is, a base station sends a measurement configuration to the terminal. The terminal performs periodic measurement based on the configuration, and determines, based on a preconfigured threshold, whether to report a measurement result. The base station determines, based on the received measurement result, whether to allow the terminal to perform handover. If the current serving base station determines to allow the terminal to perform handover, the current serving base station sends a handover request to a target base station, where the handover request includes the measurement result of the terminal. The target base station configures, based on the measurement result that is of the terminal and that is forwarded by the source base station serving the terminal, a PRACH resource used by the terminal to perform contention-free random access (where compared with contention-based random access, the contention-free random access can prevent a random access failure caused because a plurality of terminals use a same resource). Alternatively, further, the base station configures one or more cells for the terminal as one or more target cells to which the terminal hands over based on a condition. The condition may include one or two measurement results. When finding that at least one of the conditions is satisfied, the terminal may perform handover.

However, for the DU, there is no corresponding handover solution currently. It is assumed that the DU follows the current handover mechanism of the terminal. This may cause a resource conflict. For example, the DU of the IAB node may serve one or more terminals, and function as a base station. Usually, the DU sends an SSB to serve the terminal. To avoid affecting the terminal, a resource location of the SSB usually does not change. However, when the IAB node migrates across donor nodes, a new parent node of the migrated IAB node sends an SSB to serve the migrated IAB node (for example, an MT of the migrated IAB node needs to receive or measure the SSB at a resource location of the SSB). Due to a half-duplex constraint, the IAB node cannot send an SSB and receive an SSB from another device at the same time. If the resource location of the SSB sent by the new parent node of the migrated IAB node overlaps the resource location of the SSB sent by the DU of the IAB node, a resource conflict is caused.

For another example, to ensure that a random access channel (RACH) in a cell does not interfere with a neighboring cell, the neighboring cell usually uses a different ZC root sequence. A PRACH of a cell needs to use one or more ZC root sequences to generate a preamble sequence. Currently, there are 839 ZC root sequences in a frequency range 1 FR1 and 139 ZC root sequences in a frequency range 2 FR2. The FR1 may be considered as a low frequency band, and usually refers to a frequency band range from 410 MHz to 7125 MHz. Relatively, the FR2 frequency band is a high frequency band, and usually refers to a frequency band range from 24.25 GHz to 52.6 GHz. As the IAB node moves, a ZC root sequence used by a cell in which the IAB node is located may conflict with a ZC root sequence used by another cell, that is, a resource conflict is caused.

In addition, because the IAB node may serve a plurality of terminals, information configured by a network side for the plurality of terminals is stored in a donor node currently connected to the IAB node. In other words, a mobile anchor of the terminal is in the donor base station. If the IAB node migrates across donor nodes, the plurality of terminals need to be reconfigured. For example, the plurality of terminals each needs to receive a higher layer configuration on the network side, and the higher layer configuration may include, for example, a key, a transmission resource configuration, a pilot or reference signal configuration, and a measurement configuration of a new donor node. Because the network side needs to send the higher layer configurations to the plurality of terminals, the network side needs to send a large quantity of signaling in short time. This increases load of the network side and the backhaul link. In addition, the higher layer configurations are generated at the new donor node, and are forwarded to the terminal through one or more hops. In this case, a serious delay exists. If the terminal is running a service that has a high requirement on a delay, for example, a game service, game freezing may be caused, reducing user experience quality.

In view of this, embodiments of this application provide a communication method. In the method, a DU of the IAB node uses a piece of configuration information that is of the DU and that is configured by a target donor base station for the IAB node, only when an MT of an IAB node satisfies a specific condition. That is, an occasion on which the IAB node uses a piece of configuration information that is of the DU and that is from the target donor base station is specified, and the occasion is that the MT of the IAB node satisfies the specific condition. Because the DU of the IAB node uses new configuration information provided that the MT satisfies the specific condition, in a process of implementing cross-donor base station handover of the IAB node, a conflict between a resource for the DU of the IAB node to send, for example, a synchronization signal block (SSB) and a resource for the MT of the IAB node to send an SSB can be avoided, thereby avoiding a communication exception of a terminal as much as possible. In addition, in the method, the IAB node prestores configuration information of P terminals. In this way, when the MT of the IAB node performs handover of a parent node of a backhaul link, the DU of the IAB node sends the configuration information to the P terminals. This can reduce a handover delay of the terminal.

The following describes in detail the communication method provided in embodiments of this application with reference to the accompanying drawings.

Figure 10:
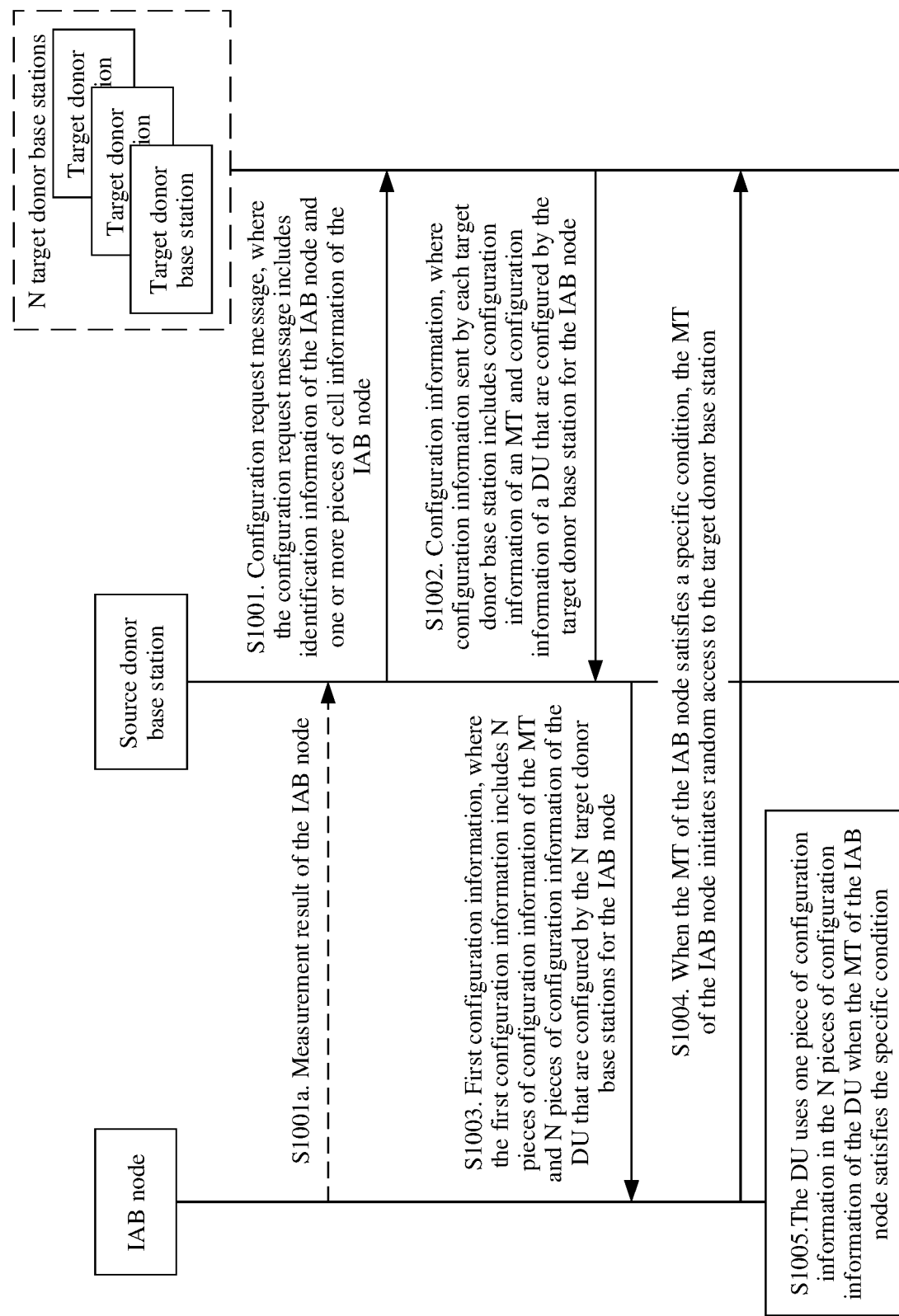
FIG. 10 is a schematic flowchart of a communication method according to an embodiment of this application.

FIG. 10 is a flowchart of a communication method according to an embodiment of this application. In the following descriptions, an example in which the method is applied to the communication systems shown in FIG. 4 and FIG. 5 is used. In addition, the method may be performed by three communication apparatuses. The three communication apparatuses are, for example, a first communication apparatus, a second communication apparatus, and a third communication apparatus. For ease of description, in the following, an example in which the method is performed by an IAB node, a source donor base station, and a target node is used. In other words, an example in which the first communication apparatus is the IAB node, the second communication apparatus is the source donor base station, and the third communication apparatus is the target node is used. The target node may be a target donor base station, or may be another IAB node. In the following, an example in which the target node is the target donor base station is used. For example, in the following, the IAB node may be the relay node in FIG. 4, or may be any IAB node in FIG. 5. It should be noted that the communication systems in FIG. 4 and FIG. 5 are merely used as examples in this embodiment of this application. A scenario is not limited thereto.

It should be understood that the source donor base station is a donor base station currently connected to the IAB node. The IAB node herein is an IAB node to be migrated, and may also be referred to as an IAB node to be handed over, that is, an IAB node that needs to perform handover of a source donor base station currently connected to the IAB node. The target donor base station is a base station to which the IAB node migrates or hands over. In the following, the source donor base station may also be referred to as a source IAB donor, the target donor base station may be referred to as a target IAB donor, and an example in which a terminal is UE is used.

Specifically, a procedure of the communication method provided in this embodiment is described as follows.

S1001. The source donor base station sends a configuration request message to N target donor base stations, where the configuration request message includes identification information of the IAB node and one or more pieces of cell information of the IAB node, and N is greater than or equal to 1.

The source donor base station may configure, for the IAB node, a measurement configuration, that is, measurement-related information, which may include, for example, parameters for measuring a plurality of target donor base stations. The IAB node measures the plurality of target donor base stations based on the measurement configuration, and reports measurement results to the source donor base station. The source donor base station may determine, from the plurality of target donor base stations based on the measurement results, the N target donor base stations to which the IAB node migrates.

It should be understood that before S1001, the IAB node may perform S1001*a*, that is, the IAB node sends the measurement results of the IAB node to the source donor base station. In some embodiments, the source donor base station may not need to determine the N target donor base stations based on the measurement results of the IAB node. For example, the source donor base station may determine the N target donor base stations based on historical information or network-specified information. It can be learned that S1001*a* is an optional step that is not indispensable, and therefore is shown by a dashed line in FIG. 10.

After determining the N target donor base stations, the source donor base station may separately send the configuration request message to the N target donor base stations, where the configuration request message is used to request configuration information configured by the N target donor base stations for the IAB node. For example, the configuration information may include configuration information of an MT and configuration information of a DU. It should be understood that the configuration request message is used to request the configuration information configured by the N target donor base stations for the IAB node, and one purpose is for handover of the IAB node. Therefore, in some embodiments, the configuration request message may alternatively be a handover request message indicating that the IAB node needs to perform handover. The target donor base station receives the handover request message, and the handover request message is the configuration information of the IAB node. It should be understood that the configuration request message may be carried in Xn interface signaling, or certainly, may be carried in other inter-base station interface signaling.

The configuration request message may include the identification information used to indicate the IAB node, for example, an ID of the IAB node, and for another example, an E-UTRAN cell global identifier (ECGI). In this way, the target donor base station may know, based on the identification information of the IAB node, that the configuration request message is configuration information of a specific IAB node. In addition, the configuration request message may further include one or more pieces of cell information of the IAB node, that is, cell information of the DU of the IAB node, for example, cell ID information of the DU of the IAB node, for example, a physical cell identifier (PCI). Because the DU of the IAB node has one or more cells, the target donor base station may be notified, in advance by using the configuration request message, of specific PCIs used by the IAB node, so that the target donor base station generates the configuration information for the IAB node based on the PCI reported by the IAB node, for example, generates an SSB.

The configuration request message may further include at least one of the measurement result of the IAB node, the configuration information of the MT of the IAB node, and the configuration information of the DU of the IAB node. The measurement result of the IAB node may be a result of measuring the SSB of the target donor base station by the IAB node, and may be carried in the configuration information of the MT. Because the configuration request message includes the configuration information of the MT of the IAB node and the configuration information of the DU of the IAB node, the target donor base station may reconfigure configuration information of the MT and configuration information of the DU for the IAB node based on the configuration information of the MT of the IAB node and the configuration information of the DU of the IAB node. For example, the target donor base station does not need to configure configuration information of the MT and configuration information of the DU that are the same as those of the IAB node, so that load of the target donor base station can be reduced, and overheads of subsequently sending information configured for the IAB node by the target donor base station can be reduced. For another example, if the configuration information of the MT of the IAB node indicates that a configuration of the SSB is modified, the target donor base station may determine that all terminals served by the IAB node need to be reconfigured.

It should be noted that a result of measuring the SSB of the target donor base station by the IAB node may be a result of measuring a cell defining SSB of the target donor base station by the IAB node, may be a result of measuring a non-cell defining SSB of the target donor base station by the IAB node, or may be a result of measuring a synchronization signal raster frequency (off-sync raster) SSB of the target donor base station by the IAB node. After the MT of the IAB node accesses a network, the MT may be configured to measure the cell defining SSB, the non-cell defining SSB, or the off-sync raster SSB.

The configuration information of the DU may include a cell-specific signal and a channel configuration of a current running cell of the DU. The cell-specific signal may include, for example, synchronization information, a channel state information reference signal (CSI-RS), and a PRACH resource configuration. Further, the configuration information of the DU may further include transmission configuration information of an SSB of at least one cell of the DU, for example, a synchronization signal transmission configuration (STC). The SSB may be a cell defining SSB, a non-cell defining SSB, or an off-sync raster SSB.

S1002. The N target donor base stations send the configuration information to the source donor node, where configuration information sent by each target donor base station includes the configuration information of the MT and the configuration information of the DU that are configured by the target donor base station for the IAB node.

It should be understood that the MT is configured to communicate with a parent node of the IAB node or the source donor base station, and the DU is configured to communicate with a child node of the IAB node or a terminal. Each target donor base station generates the configuration information for the IAB node, and sends the configuration information to the source donor base station, and the source donor base station forwards the configuration information to the IAB node.

S1003. The source donor base station sends first configuration information to the IAB node, where the first configuration information includes N pieces of configuration information of the MT and N pieces of configuration information of the DU that are configured by the N target donor base stations for the IAB node.

It should be understood that the first configuration information is generated by the N target donor base stations and sent to the source donor base station. Each target donor base station generates the configuration information of the MT and the configuration information of the DU for the IAB node. The source donor base station may send the configuration information of the MT to the IAB node by using RRC signaling, and send the configuration information of the DU to the IAB node by using an F1-AP message. In some embodiments, the F1-AP message may alternatively be carried in the RRC signaling for sending.

In a possible implementation, the configuration information of the MT may include a plurality of types of information. For example, the configuration information of the MT may include a backhaul adaptation protocol (BAP) layer configuration, for example, backhaul routing information of the MT of the IAB node. The BAP configuration may be understood as a backhaul link adaptation layer configuration of the MT of the IAB node, and is used for routing. After the IAB node migrates, data received by the IAB node from the terminal before the IAB node migrates may be transmitted over a path indicated by the BAP configuration. After the IAB node performs handover, a reconfiguration delay of the MT of the IAB node can be reduced, and impact on a backhaul throughput caused because the IAB node performs handover of a parent node can be reduced. For another example, the configuration information of the MT may include data bearer mapping information of the MT. For still another example, the configuration information of the MT may include quality of service (QOS) configuration information of the MT.

Because the IAB node may be space-division-based, in a possible implementation, the configuration information of the MT may further include a slot format configuration of the MT, for example, a TDD uplink slot configuration and a TDD downlink slot configuration of the IAB node (TDD-UL-DL-ConfigDedicated-IAB-MT), which are mainly used to configure a transmission direction. The MT of the IAB node communicates with a DU of the parent node of the IAB node based on the slot format configuration of the MT.

The configuration information of the DU may also include a plurality of types of information. For example, the configuration information of the DU may include an STC of at least one cell of the DU. The configuration information of the DU may further include a PRACH resource configuration used by the DU to provide a service for a child node. For example, the configuration information of the DU may include two sets of PRACH resource configurations: a first set of PRACH resource configurations and a second set of PRACH resource configurations. The first set of PRACH resource configurations may be used by the terminal to initiate random access, and the second set of PRACH resource configurations may be used by a child IAB node to initiate random access. This can avoid ZC root sequence repetition that may be caused because the IAB node performs handover of the parent node, and avoid PRACH interference. In addition, usually, because an antenna of the IAB node is high, or the like, the MT of the IAB node can receive a PRACH resource of a parent IAB node that is far away (for example, 5 km away from the IAB node), and initiate random access. However, a coverage range of the PRACH resource configured by the IAB node for the terminal is narrow. For example, a coverage diameter is 3 km. In this case, if the IAB node uses the PRACH resource configured for the terminal, that is, the PRACH resource with a coverage range of 3 km, to access the parent node 5 km away, that is, perform access out of the range, an access failure is caused. Therefore, existence of the second set of PRACH resource configurations can avoid a case in which an MT of a child IAB node cannot send a random access request because the child IAB node receives a random access request of the terminal. It is considered that a frequency at which the IAB accesses a network is lower than a frequency at which the terminal accesses a network. In this case, a period of a PRACH resource of the second set of PRACH resource configurations is greater than a period of a PRACH resource of the first set of PRACH resource configurations. It should be noted that the second set of PRACH resource configurations may be considered as being dedicated to the IAB node. The IAB node can use both the second set of PRACH resource configurations and the first set of PRACH resource configurations, but the terminal can use only the first set of PRACH resource configurations and cannot use the second set of PRACH resource configurations.

For the first set of PRACH resource configurations, a PRACH resource configuration that is used by a terminal to generate a preamble sequence in a current technology is also followed. Details are not described herein. The second set of PRACH resource configurations is dedicated to the IAB node, and may include configuration information used for random access, for example, periodicity scaling information, a system frame offset configuration, and a subframe/slot offset configuration. Specifically, the second set of PRACH resource configurations may include at least one of a ZC root sequence index, a PRACH configuration index, a quantity of RACH occasions that is associated with each SSB, or an offset configuration of a slot/subframe that has a RACH occasion. It is different from the current technologies that, in a scenario in which the IAB node migrates across donor base stations, the second set of PRACH resource configurations may further include a periodicity scaling factor, and the periodicity scaling factor and the PRACH configuration index are combined to determine a period of the PRACH resource. In other words, based on an existing implementation, the periodicity scaling factor may be newly added to the second set of PRACH resource configurations. This more facilitates compatibility with a PRACH resource configuration in the existing implementation.

In a possible implementation, the configuration information of the DU may further include a TDD uplink slot configuration and a TDD downlink slot configuration, and is used by the DU to communicate with the child node or the terminal. The configuration information of the DU may further include an available resource, an unavailable resource, a hard-type resource, a soft-type resource, and the like of the DU of the IAB node. In some embodiments, the configuration information of the DU may further include a periodic cell downlink reference signal configuration, for example, a CSI-RS configuration.

It should be understood that the target donor base station may generate a part of the configuration information of the MT of the IAB node, and another part of the configuration information of the MT may be indicated as original configuration information of the MT of the IAB node by using a network side. That is, the network side indicates, by using signaling, that when the IAB node migrates, the MT uses the received part of the configuration information of the MT and the another part of the configuration information existing in the MT. Certainly, the network side does not necessarily send the signaling, and it may alternatively be agreed upon by a system or a protocol that when the IAB node migrates, the MT uses the received part of the configuration information of the MT and the another part of the configuration information existing in the MT. That is, for a configuration that is not in the received configuration information, the MT follows the existing configuration by default.

It should be noted that, that the MT uses the configuration information may alternatively be considered as that the configuration information takes effect or that the configuration information is enabled. Similarly, in the following, that the DU uses the configuration information means that configuration information to be used by the DU takes effect or the DU enables the configuration information when the DU needs to use the configuration information.

S1004. When the MT of the IAB node satisfies a specific condition, the MT of the IAB node initiates random access to the target donor base station.

S1005. The DU uses one piece of configuration information in the N pieces of configuration information of the DU when the MT of the IAB node satisfies the specific condition.

Because the IAB node includes the MT and the DU, if the MT and the DU use the configuration information after receiving the configuration information respectively, a resource conflict may occur after the IAB node migrates. In this case, this embodiment provides an occasion on which the MT and the DU use the configuration information, to avoid the resource conflict that may occur after the IAB node migrates. In other words, this embodiment provides a mechanism for the IAB node to migrate across donor base stations. The mechanism limits the occasion on which the MT and the DU use the configuration information.

Specifically, after forwarding the received configuration information of the MT and the received configuration information of the DU to the IAB node, the source donor base station may further send, to the IAB node, one or more conditions for the MT to use the received configuration information. It should be noted that a sequence of forwarding, by the source donor base station, the received configuration information of the MT and the received configuration information of the DU to the IAB node and sending, by the source donor base station to the IAB node, the one or more conditions for the MT to use the received configuration information is not limited in this embodiment. For example, the two may be simultaneously sent to the IAB node. The source donor base station may send, to the IAB node by using one piece of signaling, for example, RRC signaling, the one or more conditions for the MT to use the received configuration information, or may send, to the IAB node by using a plurality of pieces of RRC signaling, a plurality of conditions for the MT to use the received configuration information. For example, each condition is carried in one piece of RRC signaling.

It should be understood that the one or more conditions for the MT to use the received configuration information may be used to indicate that the MT initiates a random access process to the target donor base station after satisfying the one or more conditions. It should be understood that the initiating a random access process to the target donor base station may be directly initiating the random access process to the target donor base station, or may be initiating the random access process to a child node connected to the target donor base station. For ease of description, in the following, the condition that needs to be satisfied before the MT initiates the random access process to the target donor base station is referred to as a specific condition. For example, the specific condition may include one or more of the following conditions. The following separately describes the several specific conditions.

Condition 1: A result of measuring a first signal by the MT of the IAB node is less than a first preset threshold, where the first signal is sent by a current serving node of the IAB node, that is, the parent node currently connected to the IAB node or the source donor base station. When the result of measuring the first signal by the MT of the IAB node is less than the first preset threshold, it may be considered that communication quality of a current backhaul link of the IAB node is poor. In this case, the IAB node may hand over to, for example, the target donor base station, to ensure the communication quality of the backhaul link of the IAB node as much as possible. In this case, the DU of the IAB node uses the new configuration information, to implement handover of the parent node of the IAB node.

It should be understood that the first preset threshold may be a preset value, a value defined by a system, or a value agreed upon by a protocol. In some embodiments, the first preset threshold may alternatively be a part of the condition 1. To be specific, the condition 1 is that the result of measuring the first signal by the MT of the IAB node is less than the first preset threshold, and the first preset threshold is sent by the source donor base station to the IAB node as the condition 1.

Condition 2: A result of measuring a second signal by the MT of the IAB node is greater than a second preset threshold, where the second signal is not sent by the parent node currently connected to the IAB node or the source donor base station. When the result of measuring the second signal by the MT of the IAB node is greater than the second preset threshold, it may be considered that there is another IAB node or network node (for example, the target donor base station), and a result of measuring, by the MT of the IAB node, a signal sent by the another IAB node or network node is better than a result of measuring, by the MT of the IAB node, a signal sent by the parent node currently connected to the IAB node or the source donor base station. In this case, the IAB node may hand over to the target donor base station, to improve communication quality of a backhaul link of the IAB node as much as possible, and the DU of the IAB node uses the new configuration information, to implement handover of the parent node of the IAB node. For example, the second preset threshold may alternatively be a preset value, a value defined by a system, or a value agreed upon by a protocol. For another example, the second preset threshold may be related to the result of measuring the second signal. For example, the second preset threshold is a sum of the result of measuring the second signal and a fixed value. In some embodiments, the second preset threshold may alternatively be a part of the condition 2. To be specific, the condition 2 is that the result of measuring the first signal by the MT of the IAB node is less than the second preset threshold, and the second preset threshold is sent by the source donor base station to the IAB node as the condition 2.

Condition 3: A beam failure occurs on the MT of the IAB node on a first carrier link, where the first carrier link is a communication link between the IAB node and the parent node currently connected to the IAB node or the source donor base station. For example, strength of a reference signal is used to represent link quality (a beam). The terminal measures each reference signal in a reference signal set in a higher layer configuration. If strength of each reference signal in the reference signal set is less than a threshold, a beam failure occurs. For explanation of the beam failure, refer to descriptions in the 3GPP standard.

It should be noted that, that a beam failure occurs on the MT of the IAB node on a first carrier link further includes a case in which the beam failure still occurs after the beam failure occurs on the MT of the IAB node on the first carrier link and is recovered. A recovery failure of the beam failure means that the terminal detects the beam failure and attempts to discover a new beam to recover communication, but the process also fails.

Condition 4: A radio link failure occurs on the MT of the IAB node on a second carrier link. For example, the MT determines that measured RSRP is small, or the MT cannot decode a physical downlink control channel (PDCCH) or a physical downlink shared channel (PDSCH). The second carrier link is a communication link between the IAB node and the parent node currently connected to the IAB node or the source donor base station. For explanation of the radio link failure, refer to descriptions in the 3GPP standard.

The foregoing condition 3 and condition 4 may be considered as that the backhaul link of the IAB node is interrupted or blocked. In this case, the IAB node may perform handover of the parent node currently connected to the IAB node or the source donor base station, to ensure communication quality of the backhaul link of the IAB node as much as possible. In addition, in this case, the DU of the IAB node uses the new configuration information, to implement handover of the parent node of the IAB node.

Condition 5: A duration accumulated since the MT of the IAB node receives the configuration information from the source donor base station satisfies a preset duration. The condition may be considered as that a clock is preset, and after the MT of the IAB node receives the configuration information and the clock expires, the DU of the IAB node uses the new configuration information. In this way, the IAB node does not need to perform measurement or the like, and implementation of the IAB node is simpler.

The foregoing lists five possible specific conditions. A specific condition to be specifically selected may be configured by a base station or specified in a protocol. A manner of indicating the specific condition to be selected is not limited in this embodiment.

Further, when satisfying any one of the foregoing five conditions, the MT may perform the random access process. Because there are a plurality of target serving nodes, a target serving node to be accessed may be selected based on a specific condition, that is, the MT determines, based on the specific condition, the target serving node to be accessed. It should be noted that the target serving node includes the target donor base station, and may also include an IAB node connected to the target donor base station.

In a possible implementation, a rule for the MT to select the target serving node to be accessed may include but is not limited to the following:

For example, in Rule 1: the MT of the IAB node may select a target serving node corresponding to configuration information satisfying the foregoing five specific conditions, to perform random access. It should be understood that, if there are a plurality of target serving nodes corresponding to configuration information satisfying the foregoing five specific conditions, the MT of the IAB node may select any one of the plurality of target service nodes.

In Rule 2: The MT of the IAB node selects a target serving node that sends a reference signal with the greatest strength, to ensure, as much as possible, communication quality of a backhaul link after handover of the IAB node. The strength of the reference signal may be represented by reference signal received power. For example, the MT measures reference signal received power (RSRP) of all target serving nodes, sorts obtained measurement results in descending order, and selects the first target serving node after the sorting.

Rule 3: The MT of the IAB node selects a target serving node whose operating frequency band is the same as an operating frequency band of the source donor base station, so that complexity of reconfiguring a resource of the MT of the IAB node and a resource of the DU of the IAB node can be reduced, and impact on the terminal can be reduced. It should be understood that, that the operating frequency bands are the same may be that center frequencies of carriers are the same, or may be that center frequencies of SSBs are the same.

Rule 4: The MT of the IAB node selects a node of which a random access occasion of a PRACH resource arrives the earliest. In this way, the MT of the IAB node can initiate random access earlier, and impact caused by link communication quality deterioration or a link exception can be reduced.

The foregoing describes the specific condition that needs to be satisfied by the MT to use the received configuration information. The following describes an occasion on which the DU uses the received configuration information. When the MT satisfies the foregoing specific condition, the DU may use one piece of configuration information in the N pieces of configuration information of the DU.

In addition, the DU may also use one piece of configuration information in the N pieces of configuration information of the DU when the following specific condition is satisfied.

For example, when the MT starts or completes the random access process, the DU uses one piece of configuration information in the N pieces of configuration information of the DU. Usually, when the MT of the IAB node starts or completes the random access process, it may be considered that the IAB node performs handover of the backhaul link. In this case, the DU of the IAB node uses the new configuration information. In this way, the IAB node also does not need to perform measurement or the like, and implementation of the IAB node is simpler.

For another example, when the MT receives first signaling from the source donor base station, the DU uses one piece of configuration information in the N pieces of configuration information of the DU. The first signaling is used to indicate the IAB node to hand over to a first target donor base station. In the specific condition, the IAB node performs handover of the currently connected parent node according to an instruction of the source donor base station, and does not need to determine a handover occasion. This can reduce calculation load of the IAB node, make implementation of the IAB node simpler, and more facilitate resource management on a network side.

For still another example, when the IAB node moves out of a target area, the DU uses one piece of configuration information in the N pieces of configuration information of the DU. When the IAB node is mobile, the IAB node may move out of a coverage range of the parent node or move to an area with poor signal quality. In the specific condition, that the IAB node is located in the target area may be considered as that communication quality of the current backhaul link of the IAB node is high, and when the IAB node moves out of the target area, it is considered that, to ensure the communication quality, the IAB node may perform handover of the parent node of the IAB node, that is, the DU of the IAB node uses the new configuration information.

In a possible implementation, a manner of determining whether the IAB node moves out of the target area includes but is not limited to the following several manners:

Manner 1: If an area identifier (ID) received by the IAB node is inconsistent with a locally stored area ID, the IAB node moves out of the target area. It should be understood that the area ID may alternatively be preconfigured by a system. When an ID of an area in which the IAB node is located is inconsistent with the preconfigured area ID, the IAB node moves out of the target area.

Manner 2: If an ID of a cell in which the IAB node is currently located is not in a received cell list, the IAB node moves out of the target area. It should be understood that a system may also preconfigure a cell list. When the cell in which the IAB node is located is not in the preconfigured cell list, the IAB node moves out of the target area.

Manner 3: If a donor base station corresponding to a node currently connected to the IAB node is not in a received donor base station list, the IAB node moves out of the target area. It should be understood that a system may also preconfigure a donor base station list. When the donor base station corresponding to the IAB node is not in the preconfigured donor base station list, the IAB node moves out of the target area.

It should be understood that the area ID, the cell list, or the donor base station list may be predefined by the system, or may be sent by the source donor base station to the IAB node. Only three manners of determining whether the IAB node moves out of the target area are listed above. Whether the IAB node moves out of the target area may be determined based on any one of the foregoing listed manners, to further determine an occasion on which the DU of the IAB node uses the new configuration information.

For ease of understanding, the following uses an example in which the configuration information of the DU includes a PRACH resource configuration to describe the occasion on which the DU uses the received configuration information.

The system or the network side may configure an effective area of a PRACH resource by using the area ID, the cell list, the donor base station list, or the like. The effective area may be preconfigured by the system, or may be notified by the network side. For example, the network side implements notification of the effective area by broadcasting a system message. When the IAB node is located in the effective area, the PRACH resource does not need to be updated.

For example, when the IAB node is connected to a new parent node corresponding to a non-effective area, that is, the new parent node is not in, for example, the foregoing cell list, or a target donor base station connected to the new parent node is not in the donor base station list, the DU of the IAB node uses the received configuration information, that is, updates the PRACH resource. Alternatively, when the IAB node detects, through measurement, a new parent node corresponding to a non-effective area, that is, the new parent node is not in, for example, the foregoing cell list, or a target donor base station connected to the new parent node is not in the donor base station list, the DU of the IAB node uses a new PRACH resource.

For another example, when the IAB node migrates or moves, and the ID of the area in which the IAB node is located is not in the effective area, a new PRACH resource is used. When the IAB node migrates, an area ID corresponding to a current PRACH resource of the IAB node needs to be compared with an area ID broadcast by a new parent node or a new target donor base station. If the area IDs are inconsistent, the new PRACH resource is used.

In a possible implementation, the IAB node may alternatively determine, based on a measurement result of the MT of the IAB node, whether to use the new PRACH resource, that is, an occasion on which the IAB node uses the new PRACH resource depends on the measurement result of the MT of the IAB node. For example, the MT of the IAB node discovers a neighboring cell based on a measurement configuration, for example, a synchronization signal measurement time configuration (SMTC) and/or PCI information, and triggers the DU of the IAB node to use the new PRACH resource. A cell ID triggering a PRACH update and new configuration information corresponding to the cell ID may be configured by the source donor base station to the MT of the IAB node by using RRC signaling.

The PRACH resource is merely used as an example in this embodiment of this application. It should be understood that this embodiment of this application is not limited to the PRACH resource. For example, the occasion on which the DU of the IAB node uses the new PRACH resource may alternatively be an occasion on which the DU of the IAB node uses an STC configuration and a PCI configuration. Compared with another configuration, because a cell of the DU of the IAB node serves the terminal, to ensure that PCIs of neighboring cells are different and avoid inter-cell interference, when the IAB node migrates or moves, a PCI or an STC may need to be reconfigured.

As described above, the source donor base station may request to obtain the PRACH resource configuration from the target donor base station. For example, the configuration request message sent by the source donor base station to the target donor base station may be used to request the PRACH resource configuration of the DU of the IAB node. In some embodiments, the source donor base station may request to obtain the PRACH resource configuration from a core network device (for example, an OAM server or an AMF entity). For example, the source donor base station sends a configuration request message to the core network device, where the configuration request message may be used to request the PRACH resource configuration of the DU of the IAB node.

In this embodiment of this application, because the DU of the IAB node uses the new configuration information provided that the MT satisfies the specific condition, in a process of implementing cross-donor base station handover of the IAB node, a conflict between a resource for the DU of the IAB node to send, for example, a synchronization signal block (SSB) and a resource for the MT of the IAB node to send an SSB can be avoided, thereby avoiding a communication exception of a terminal as much as possible. The configuration information of the DU may include, for example, the PRACH resource configuration. For a mobile IAB node, using a new PRACH resource configuration is also based on satisfying the specific condition by the MT. This can avoid ZC root sequence repetition that may be caused by movement of the IAB node in a handover process, avoid PRACH interference caused by the ZC root sequence repetition, and naturally avoid a communication exception of the terminal and interference that are caused by a conflict of a primary synchronization signal (PSS), a secondary synchronization signal (second synchronization signal, SSS), a PCI, or the like.

Figure 11:
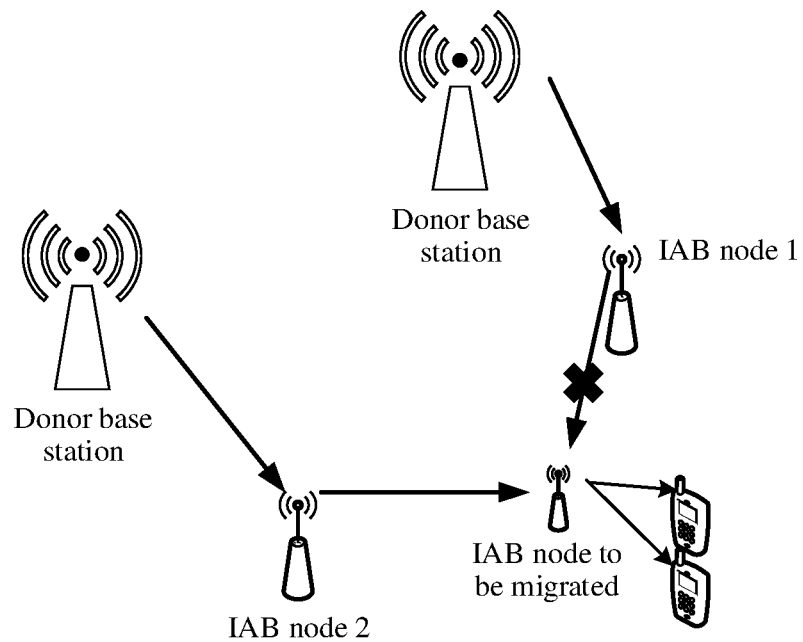
FIG. 11 is a schematic diagram of an application scenario of a mobile IAB node according to an embodiment of this application.

FIG. 11 is a schematic diagram of an application scenario according to an embodiment of this application. For example, an IAB node to be migrated, an IAB node 1, an IAB node 2, a donor base station of the IAB node 1, and a donor base station of the IAB node 2 are included in the scenario shown in FIG. 11. A parent node of an IAB node currently to be migrated is the IAB node 1. It should be understood that, if a backhaul link between the IAB node to be migrated and the IAB node 1 is interrupted or communication quality is poor, the IAB node to be migrated may perform handover of the parent node connected to the IAB node to be migrated. However, the IAB node to be migrated may serve a plurality of terminals. For example, in FIG. 11, the IAB node to be migrated serves two terminals. Information configured by a network side for the plurality of terminals is stored in a donor node currently connected to the IAB node to be migrated. If the IAB node to be migrated migrates across donor nodes, the plurality of terminals need to be reconfigured, and the network side performs reconfiguration for the plurality of terminals by using higher layer configurations. For example, the higher layer configuration may include, for example, a key, a transmission resource configuration, a pilot or reference signal configuration, and a measurement configuration of a new donor node. Because the network side needs to send the higher layer configurations to the plurality of terminals, the network side needs to send a large quantity of signaling in short time. This increases load of the network side and the backhaul link. In addition, the higher layer configurations are generated at the new donor node, and are forwarded to the terminal through one or more hops. In this case, a serious delay exists. If the terminal is running a service that has a high requirement on a delay, for example, a game service, game freezing may be caused, reducing user experience quality.

Therefore, in this embodiment of this application, the IAB node to be migrated may prestore configuration information of P terminals. In this way, when an MT of the IAB node to be migrated performs handover of the parent node of the backhaul link, a DU of the IAB node to be migrated sends the configuration information to the P terminals. This can reduce a handover delay of the terminal. It should be understood that P is greater than or equal to 1.

Specifically, still refer to FIG. 10. S1006. The source donor base station sends second configuration information to the MT of the IAB node to be migrated, where the second configuration information is P pieces of configuration information configured by the DU of the IAB node to be migrated for the P terminals, and each piece of configuration information corresponds to one terminal identifier.

Before S1006, the source donor base station currently connected to the IAB node to be migrated may send a request message to the target donor base station, where the request message is used to request, from the target donor base station, the configuration information of P terminals served by the IAB node to be migrated. It should be understood that the request message includes the terminal ID. The target donor base station responds to the request message, and sends the configuration information of the P terminals to the source donor base station by using higher layer configuration signaling. It should be understood that the higher layer configuration signaling includes a serving cell common configuration (ServingCellConfigCommon), the terminal ID (for example, a cell radio network temporary identifier (C-RNTI)), and an SSB measurement configuration. After the IAB node to be migrated performs handover of the parent node, the DU of the IAB node sends the configuration information of the P terminals to the corresponding terminals respectively. This can reduce a handover delay of the terminal.

Because there may be a plurality of target donor base stations, each target donor base station may send configuration information of the P terminals to the source donor base station. The source donor base station receives a plurality of sets of configuration information of each terminal, and the IAB node to be migrated finally also receives the plurality of sets of configuration information of each terminal. The DU of the IAB node to be migrated may determine, based on a parent node after MT migration, a specific set of configuration information to be sent to the terminal. In fact, each terminal has one or more configurations, and each configuration corresponds to a parent node or a cell identifier of the IAB. Because the configuration information is pre-stored in the DU of the IAB node, the configuration information may be transparent to the terminal.

In the solution provided in this embodiment of this application, the DU of the IAB node uses a piece of configuration information that is of the DU and that is configured by the target donor base station for the IAB node, only when the MT of the IAB node satisfies the specific condition. Because the DU of the IAB node uses new configuration information provided that the MT satisfies the specific condition, in a process of implementing cross-donor base station handover of the IAB node, a conflict between a resource for the DU of the IAB node to send, for example, an SSB and a resource for the MT of the IAB node to send an SSB can be avoided, thereby avoiding a communication exception of a terminal as much as possible. In addition, in the method, the IAB node prestores the configuration information of the P terminals. In this way, when the MT of the IAB node performs handover of the parent node of the backhaul link, the DU of the IAB node sends the configuration information to the P terminals. This can reduce a handover delay of the terminal.

In the foregoing embodiment provided in this application, the method provided in this embodiment of this application is separately described from perspectives of the IAB node to be migrated, the source donor base station, the target donor base station, and interaction between the IAB node to be migrated, the source donor base station, and the target donor base station. To implement functions in the method provided in this embodiment of this application, the IAB node to be migrated, the source donor base station, and the target donor base station each may include a hardware structure and/or a software module, and implement the functions in a form of the hardware structure, the software module, or a combination of the hardware structure and the software module.

A communication apparatus for implementing the foregoing method in embodiments of this application is described below with reference to the accompanying drawings. Therefore, all the foregoing content may be used in the following embodiments. Repeated content is not described again.

Figure 12:
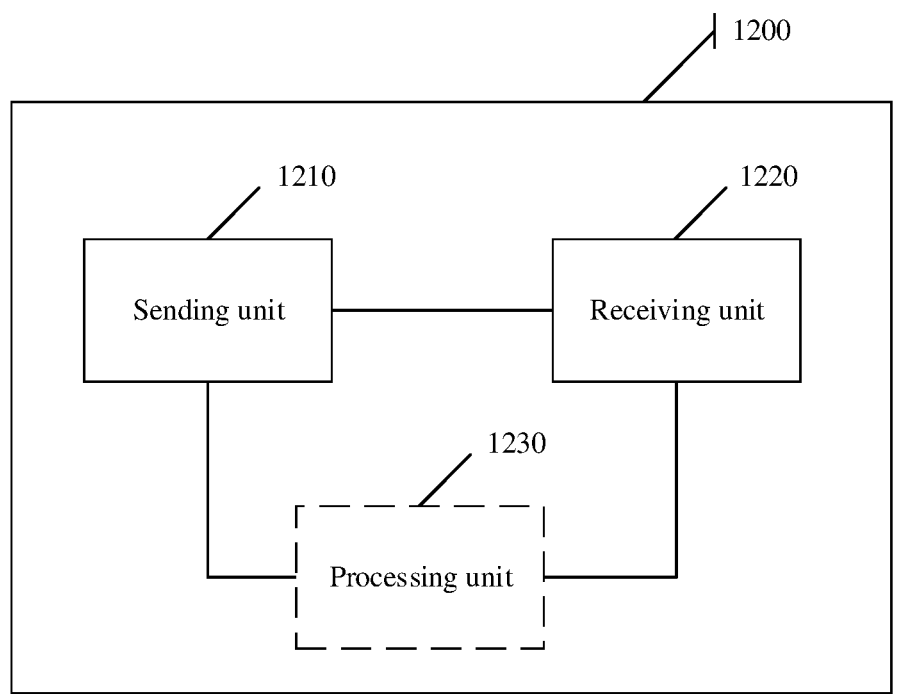
FIG. 12 is a schematic diagram of a structure of a communication apparatus according to an embodiment of this application.

FIG. 12 is a schematic diagram of a structure of a communication apparatus 1200. The communication apparatus 1200 may correspondingly implement functions or steps implemented by the IAB node, the source donor base station, or the target donor base station in the foregoing method embodiments. The communication apparatus may include a sending unit 1210 and a receiving unit 1220; and optionally, may further include a processing unit 1230, which is shown by using dashed lines in FIG. 12. Optionally, the communication apparatus may further include a storage unit. The storage unit may be configured to store instructions (code or a program) and/or data. The sending unit 1210, the receiving unit 1220, and the processing unit 1230 may be coupled to the storage unit. For example, the processing unit 1230 may read the instructions (the code or the program) and/or the data in the storage unit, to implement a corresponding method. The foregoing units may be disposed independently, or may be partially or completely integrated. For example, the sending unit 1210 and the receiving unit 1220 may be integrated and referred to as a transceiver unit.

In some possible implementations, the communication apparatus 1200 can correspondingly implement behavior and functions of the IAB node in the foregoing method embodiments. For example, the communication apparatus 1200 may be the IAB node, or may be a component (for example, a chip or a circuit) used in the IAB node. The sending unit 1210 and the receiving unit 1220 may be configured to perform all receiving or sending operations performed by the IAB node in the embodiment shown in FIG. 10, for example, S1003 and S1004, or S1001a, S1003, and S1004 in the embodiment shown in FIG. 10, and/or configured to support another process of the technology described in this specification. The processing unit 1230 is configured to perform all operations, except sending and receiving operations, performed by the IAB node in the embodiment shown in FIG. 10, for example, S1005 in the embodiment shown in FIG. 10, and/or configured to support another process of the technology described in this specification.

In some embodiments, the receiving unit 1220 is configured to receive first configuration information from a source donor base station, where the first configuration information includes N pieces of configuration information of an MT and N pieces of configuration information of a DU that are configured by N target donor base stations for the communication apparatus, N is greater than or equal to 1, the MT is configured to communicate with a parent node of the communication apparatus, the source donor base station, or the target donor base station, and the DU is configured to communicate with a child node of the communication apparatus or a terminal.

The processing unit 1230 is configured to be used by the DU of the communication apparatus to use one piece of configuration information in the N pieces of configuration information of the DU when the MT of the communication apparatus satisfies a specific condition.

In a possible implementation, the specific condition includes the following:

a result of measuring a first signal by the MT of the communication apparatus is less than a first preset threshold, where the first signal is sent by the parent node currently connected to the communication apparatus or the source donor base station;

a result of measuring a second signal by the MT of the communication apparatus is greater than a second preset threshold, where the second signal is not sent by the parent node currently connected to the communication apparatus or the source donor base station;

a beam failure occurs on the MT of the communication apparatus on a first carrier link, where the first carrier link is a communication link between the communication apparatus and the parent node currently connected to the communication apparatus or the source donor base station;

a radio link failure occurs on the MT of the communication apparatus on a second carrier link, where the second carrier link is a communication link between the communication apparatus and the parent node currently connected to the communication apparatus or the source donor base station;

a duration accumulated since the MT of the communication apparatus receives the configuration information from the source donor base station satisfies a preset duration;

the MT of the communication apparatus starts or completes a random access process;

the MT of the communication apparatus receives first signaling from the source donor base station, where the first signaling is used to indicate the communication apparatus to hand over to a first target donor base station; or the communication apparatus moves out of a target area.

In a possible implementation, that the communication apparatus moves out of a target area includes the following:

an area identifier (ID) received by the communication apparatus is inconsistent with a locally stored area ID;

an ID of a cell in which the communication apparatus is currently located is not in a received cell list; or a donor base station corresponding to a node currently connected to the communication apparatus is not in a received donor base station list.

In a possible implementation, that the DU of the communication apparatus uses one piece of configuration information in the N pieces of configuration information of the DU when N is greater than 1 includes:

randomly selecting one piece of configuration information from the N pieces of configuration information of the DU; or selecting, from the N pieces of configuration information of the DU, configuration information that is of the DU and that corresponds to a first target serving node, where the first target serving node is the first target donor base station in the N target donor base stations, or the first target serving node is an IAB node connected to the first target donor base station in the N target donor base stations, where a reference signal sent by the first target serving node has maximum strength;

an operating band of the first target serving node is the same as that of the source donor base station; or a random access occasion of a PRACH resource of the first target serving node arrives the earliest.

In a possible implementation, the configuration information of the DU includes a first set of PRACH resource configurations and a second set of PRACH resource configurations, the first set of PRACH resource configurations is used by a terminal to initiate random access, and the second set of PRACH resource configurations is used by an IAB node to initiate random access.

In a possible implementation, the second set of PRACH resource configurations includes one or more of the following configurations:

a ZC root sequence index, a PRACH configuration index, a periodicity scaling factor, a subframe or slot offset, or a quantity of RACH occasions that is associated with each synchronization signal block (SSB), where the periodicity scaling factor and the PRACH configuration index are used to determine a period of a PRACH resource.

In a possible implementation, the configuration information of the MT may further include one or more of the following information:

backhaul adaptation protocol (BAP) layer configuration information;

data bearer mapping information of the MT; or quality of service configuration information of the MT.

In a possible implementation, the receiving unit 1220 is further configured to:

receive second configuration information from the source donor base station, where the second configuration information is P pieces of configuration information configured by the DU of the communication apparatus for P terminals, each piece of configuration information corresponds to one terminal identifier, and P is greater than or equal to 1.

In some other possible implementations, the communication apparatus 1200 can correspondingly implement behavior and functions of the source donor base station in the foregoing method embodiments. For example, the communication apparatus 1200 may be the source donor base station, or may be a component (for example, a chip or a circuit) used in the source donor base station. The sending unit 1210 and the receiving unit 1220 may be configured to perform all receiving or sending operations performed by the source donor base station in the embodiment shown in FIG. 10, for example, S1001, S1002, and S1003, or S1001a, S1001, S1002, and S1003 in the embodiment shown in FIG. 10, and/or configured to support another process of the technology described in this specification.

In some embodiments, the sending unit 1210 is configured to send a configuration request message to N target donor base stations, where the configuration request message includes identification information of an IAB node and one or more pieces of cell information of the IAB node, and N is greater than or equal to 1. The receiving unit 1220 is configured to receive configuration information sent by the N target donor base stations, where configuration information sent by each target donor base station includes configuration information of an MT and configuration information of a DU that are configured by the target donor base station for the IAB node, the MT is configured to communicate with a parent node of the IAB node or the communication apparatus, and the DU is configured to communicate with a child node of the IAB node or a terminal.

In a possible implementation, the configuration request message further includes results of measuring synchronization signal blocks SSBs of a plurality of target donor base stations by the MT of the IAB node.

In a possible implementation, the configuration request message further includes at least one of cell information of the DU of the IAB node, a physical random access channel (PRACH) resource configuration, and synchronization signal configuration information.

In some other possible implementations, the communication apparatus 1200 can correspondingly implement behavior and functions of the target donor base station in the foregoing method embodiments. For example, the communication apparatus 1200 may be the target donor base station, or may be a component (for example, a chip or a circuit) used in the target donor base station. The sending unit 1210 and the receiving unit 1220 may be configured to perform all receiving or sending operations performed by the target donor base station in the embodiment shown in FIG. 10, for example, S1001, S1002, and S1004 in the embodiment shown in FIG. 10, and/or configured to support another process of the technology described in this specification.

In some embodiments, the receiving unit 1220 is configured to receive a configuration request message from a source donor base station, where the configuration request message includes identification information of an IAB node and one or more pieces of cell information of the IAB node, and N is greater than or equal to 1. The sending unit 1210 is configured to send configuration information to the source donor base station, where the configuration information includes configuration information of an MT and configuration information of a DU that are configured by the communication apparatus for the IAB node, the MT is configured to communicate with a parent node of the IAB node or the source donor base station, and the DU is configured to communicate with a child node of the IAB node or a terminal.

In a possible implementation, the configuration information of the DU includes a first set of PRACH resource configurations and a second set of PRACH resource configurations, the first set of PRACH resource configurations is used by a terminal to initiate random access, and the second set of PRACH resource configurations is used by an IAB node to initiate random access.

In a possible implementation, the second set of PRACH resource configurations includes one or more of the following configurations:

a ZC root sequence index, a PRACH configuration index, a periodicity scaling factor, a subframe or slot offset, or a quantity of RACH occasions that is associated with each synchronization signal block (SSB), where the periodicity scaling factor and the PRACH configuration index are used to determine a period of a PRACH resource.

In a possible implementation, the sending unit is further configured to send a specific condition to the source donor base station, where the specific condition includes the following:

a result of measuring a first signal by the MT of the IAB node is less than a first preset threshold, where the first signal is sent by a current serving node of the IAB node;

a result of measuring a second signal by the MT of the IAB node is greater than a second preset threshold, where the second signal is not sent by a current serving node of the IAB node;

a beam failure occurs on the MT of the IAB node on a first carrier link, where the first carrier link is a communication link between the IAB node and a current serving node of the IAB node;

a radio link failure occurs on the MT of the IAB node on a first carrier link, where the first carrier link is a communication link between the IAB node and a current serving node of the IAB node;

a duration accumulated since the MT of the IAB node receives the configuration information from the source donor base station satisfies a preset duration;

the MT of the IAB node starts or completes a random access process;

the MT of the IAB node receives first signaling from the source donor base station, where the first signaling is used to indicate the IAB node to hand over to a first target donor base station; or an area identifier (ID);

a cell list; or a donor base station list.

Figure 13:
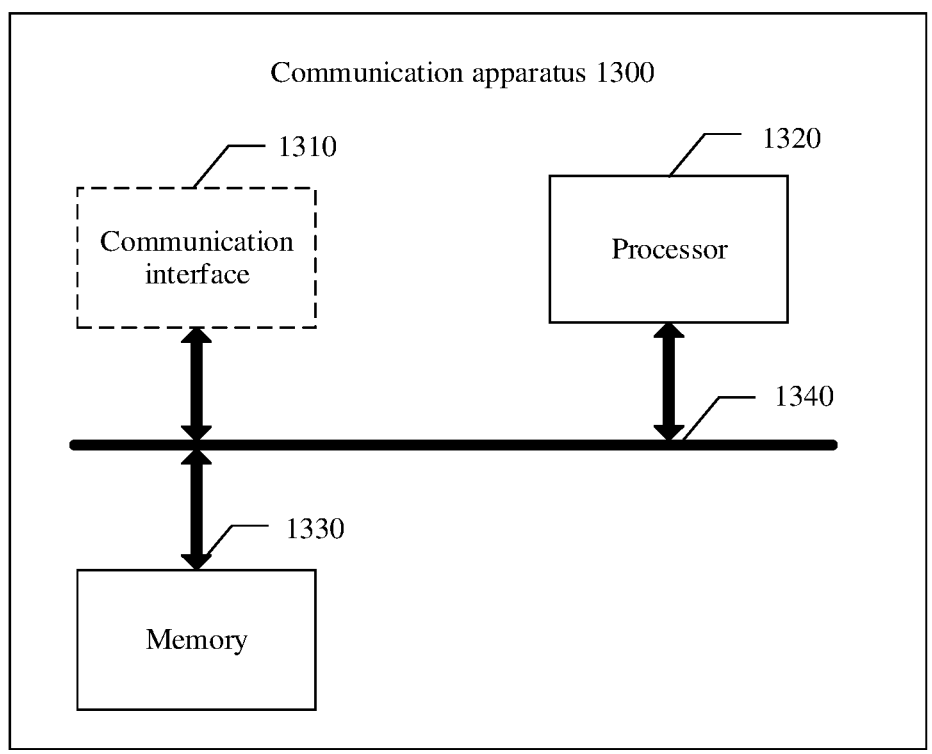
FIG. 13 is another schematic diagram of a structure of a communication apparatus according to an embodiment of this application.

FIG. 13 shows a communication apparatus 1300 according to an embodiment of this application. The communication apparatus 1300 may be an IAB node, and can implement functions of the IAB node in the method provided in embodiments of this application. Alternatively, the communication apparatus 1300 may be a base station, and can implement functions of the source donor base station or the target donor base station in the method provided in embodiments of this application. Alternatively, the communication apparatus 1300 may be an apparatus that can support the IAB node in implementing corresponding functions in the method provided in embodiments of this application, or an apparatus that can support the source donor base station or the target donor base station in implementing corresponding functions in the method provided in embodiments of this application. The communication apparatus 1300 may be a chip system or an IAB node. In embodiments of this application, the chip system may include a chip, or may include a chip and another discrete device.

In hardware implementation, the sending unit 1210 and the receiving unit 1220 may be a transceiver, and the transceiver is integrated into the communication apparatus 1300 to form a communication interface 1310.

The communication apparatus 1300 includes at least one processor 1320, configured to implement functions of the IAB node, the source donor base station, or the target donor base station in the method provided in embodiments of this application, or support the communication apparatus 1300 in implementing functions of the IAB node, the source donor base station, or the target donor base station in the method provided in embodiments of this application. For details, refer to detailed descriptions in the method example. Details are not described herein again.

The communication apparatus 1300 may further include at least one memory 1330, configured to store program instructions and/or data. The memory 1330 is coupled to the processor 1320. Coupling in this embodiment of this application is indirect coupling or a communication connection between apparatuses, units, or modules, may be in an electrical, mechanical, or another form, and is used for information exchange between the apparatuses, units, or modules. The processor 1320 may operate in collaboration with the memory 1330. The processor 1320 may execute the program instructions and/or the data stored in the memory 1330, so that the communication apparatus 1300 implements a corresponding method. At least one of the at least one memory may be included in the processor.

The communication apparatus 1300 may further include the communication interface 1310, configured to communicate with another device through a transmission medium, so that an apparatus used in the communication apparatus 1300 can communicate with the another device. For example, when the communication apparatus is the IAB node, the another device is the source donor base station and/or the target donor base station; when the communication apparatus is the source donor base station, the another device is the IAB node and/or the target donor base station; or when the communication apparatus is the target donor base station, the another device is the IAB node and/or the source donor base station. The processor 1320 may send and receive data through the communication interface 1310. The communication interface 1310 may be specifically a transceiver.

In this embodiment of this application, a specific connection medium between the communication interface 1310, the processor 1320, and the memory 1330 is not limited. In this embodiment of this application, in FIG. 13, the memory 1330, the processor 1320, and the communication interface 1310 are connected through a bus 1340. The bus is represented by a bold line in FIG. 13. A connection manner between other components is merely an example for description, and is not limited thereto. The bus may be classified into an address bus, a data bus, a control bus, or the like. For ease of representation, only one bold line is used to represent the bus in FIG. 13, but this does not mean that there is only one bus or only one type of bus.

In this embodiment of this application, the processor 1320 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor, any conventional processor, or the like. The steps of the method disclosed with reference to embodiments of this application may be directly performed and completed by a hardware processor, or may be performed and completed by using a combination of hardware in the processor and a software module.

In this embodiment of this application, the memory 1330 may be a non-volatile memory, for example, a hard disk drive (HDD) or a solid-state drive (SSD), or may be a volatile memory, for example, a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

Figure 14:
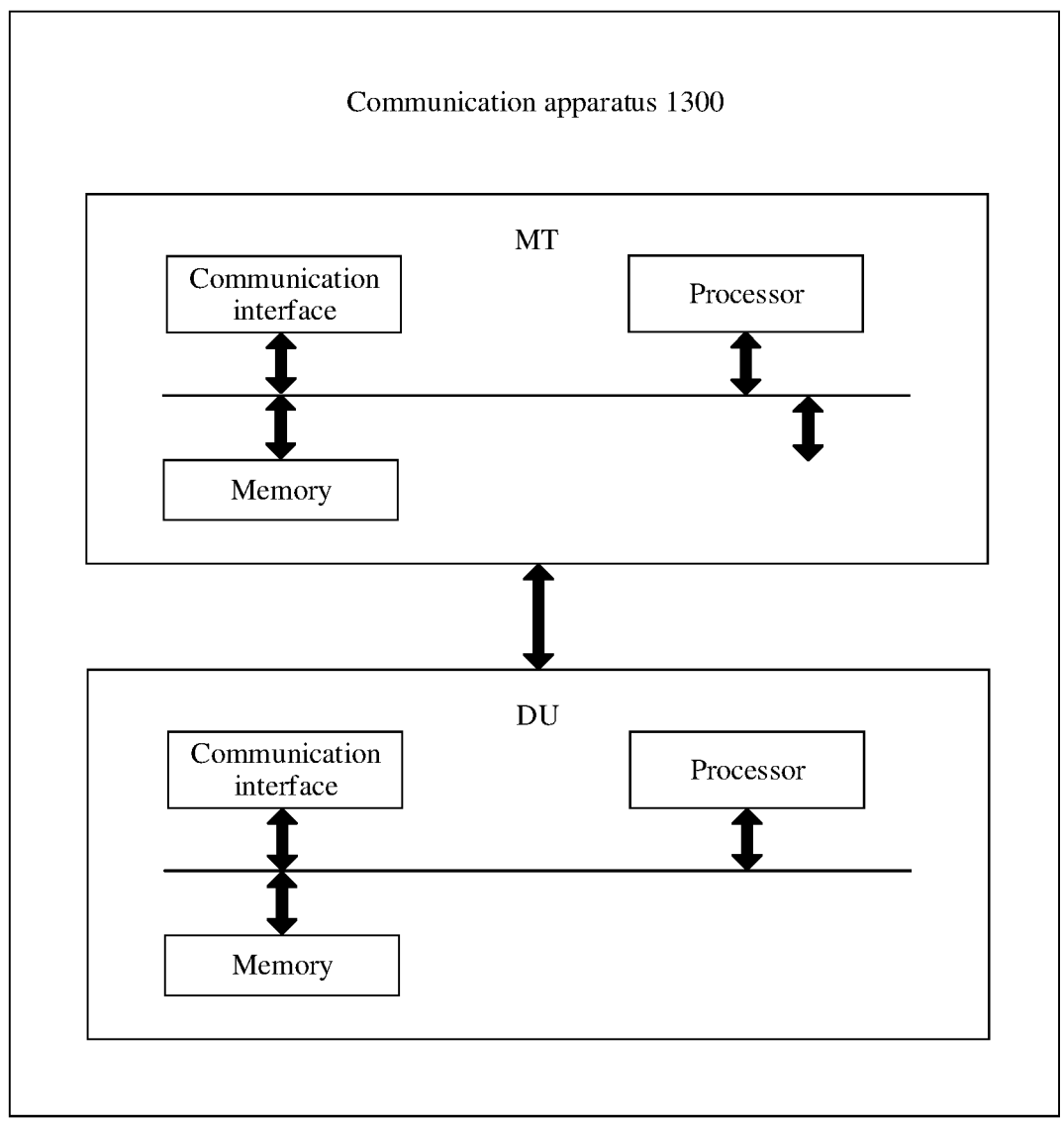
FIG. 14 is a schematic diagram of a structure of an IAB node according to an embodiment of this application.

It should be understood that when the communication apparatus 1300 is the IAB node, FIG. 14 shows another form of the communication apparatus 1300. In FIG. 14, the communication apparatus 1300 is the IAB node. It should be understood that the IAB node includes an MT and a DU. The MT may include a communication interface, a processor, a memory, and a bus connecting the communication interface, the processor, and the memory. The communication interface may be configured to communicate with a parent node of the IAB node, the source donor base station, or the target donor base station. The DU may also include a communication interface, a processor, a memory, and a bus connecting the communication interface, the processor, and the memory. The communication interface is configured to communicate with a child node of the IAB node or a terminal.

Figure 15:
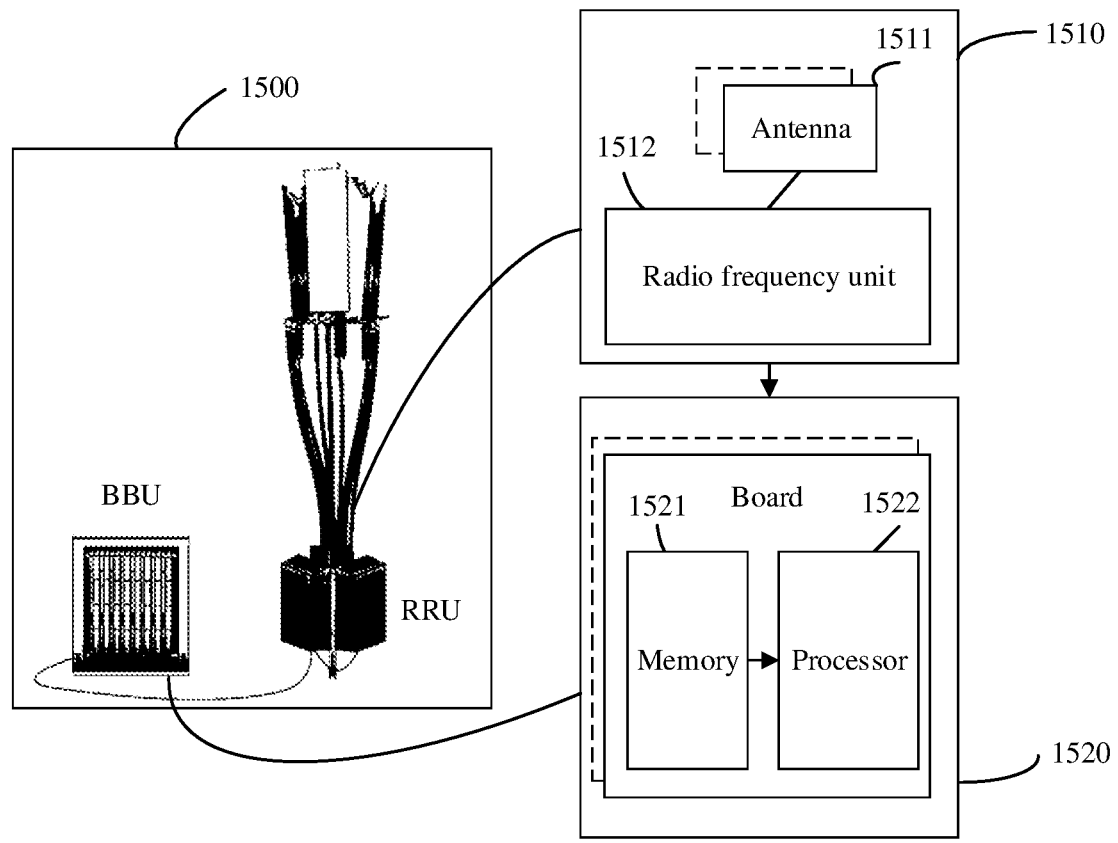
FIG. 15 is still another schematic diagram of a structure of a communication apparatus according to an embodiment of this application.

FIG. 15 shows another form of the communication apparatus. For ease of understanding and illustration, in FIG. 15, an example in which the communication apparatus is the source donor base station or the target donor base station is used. The communication apparatus 1500 may be used in the system shown in FIG. 3 or FIG. 4, and may be the donor node in FIG. 3 and FIG. 4, to perform functions of the source donor base station or the target donor base station in the foregoing method embodiment. The communication apparatus 1500 may include one or more radio frequency units, for example, a remote radio unit (RRU) 1510 and one or more baseband units (BBUs) (which may also be referred to as digital units, DUs) 1520. The RRU 1510 may be referred to as a communication module, and corresponds to the sending unit 1210 and the receiving unit 1220 in FIG. 12. Optionally, the communication module may also be referred to as a transceiver, a transceiver circuit, or the like, and may include at least one antenna 1511 and a radio frequency unit 1512. The RRU 1510 is mainly configured to: receive and send a radio frequency signal, and perform conversion between the radio frequency signal and a baseband signal. For example, the communication apparatus 1500 is the source donor base station and is configured to forward, to the IAB node, configuration information of an MT and configuration information of a DU that are configured by the target donor base station for the IAB node and that are received from the target donor base station. The BBU 1520 is mainly configured to: perform baseband processing, control a base station, and the like. The RRU 1510 and the BBU 1520 may be physically disposed together, or may be physically separated, that is, in a distributed base station.

The BBU 1520 is a control center of the base station, and may also be referred to as a processing module. The BBU may correspond to the processing unit 1230 in FIG. 12, and is mainly configured to implement a baseband processing function, for example, channel coding, multiplexing, modulation, or spreading. For example, the BBU (the processing module) may be configured to control the base station to perform an operation procedure related to the network device in the foregoing method embodiment, for example, generate the foregoing indication information.

In an example, the BBU 1520 may include one or more boards, and a plurality of boards may jointly support a radio access network (such as an LTE network) having a single access standard, or may separately support radio access networks (such as an LTE network, a 5G network, or another network) having different access standards. The BBU 1520 further includes a memory 1521 and a processor 1522. The memory 1521 is configured to store necessary instructions and data. The processor 1522 is configured to control the base station to perform a necessary action, for example, configured to control the base station to perform an operation procedure related to the IAB node, the source donor base station, or the target donor base station in the foregoing method embodiment. The memory 1521 and the processor 1522 may serve one or more boards. In other words, the memory and the processor may be separately disposed on each board. Alternatively, a plurality of boards may share a same memory and a same processor. In addition, a necessary circuit may be further disposed on each board.

An embodiment of this application further provides a communication system. Specifically, the communication system includes an IAB node, a source donor base station, and a target donor base station, or may include more IAB nodes, source donor base stations, and target donor base stations.

The IAB node, the source donor base station, and the target donor base station are separately configured to implement functions of the foregoing related devices in FIG. 10. For details, refer to the related descriptions in the method embodiment. Details are not described herein again.

An embodiment of this application further provides a computer-readable storage medium, including instructions. When the instructions are run on a computer, the computer performs the method performed by the IAB node, the source donor base station, or the target donor base station in FIG. 10.

An embodiment of this application further provides a computer program product, including instructions. When the instructions are run on a computer, the computer performs the method performed by the IAB node, the source donor base station, or the target donor base station in FIG. 10.

An embodiment of this application provides a chip system. The chip system includes a processor, may further include a memory, and is configured to implement functions of the IAB node, the source donor base station, or the target donor base station in the foregoing method. The chip system may include a chip, or may include a chip and another discrete device.

It should be understood that the terms "system" and "network" may be used interchangeably in embodiments of this application. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are intended to distinguish between a plurality of objects, but are not intended to limit an order, a time sequence, a priority, or importance of the plurality of objects. For example, a first message and a second message are merely intended to distinguish between different messages, but do not indicate that the two messages are different in a priority, a sending sequence, or importance.

It should be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application. The storage medium includes any medium such as a USB flash drive, a removable hard disk, a read-only memory (ROM), a random access memory (RAM), a magnetic disk, or an optical disc, that can store program code.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication apparatus, comprising:
a transceiver, configured to receive first configuration information from a source donor base station, wherein the first configuration information comprises N pieces of configuration information of a mobile terminal (MT)

and N pieces of configuration information of a distributed unit (DU) that are configured by N target donor base stations for the communication apparatus, N is greater than or equal to 1, the MT is configured to communicate with a parent node of the communication apparatus, the source donor base station, or the N target donor base stations, and the DU is configured to communicate with a child node of the communication apparatus or a terminal; and a processor, configured to enable the DU of the communication apparatus to use one piece of configuration information in the N pieces of configuration information of the DU when the MT of the communication apparatus satisfies a condition.

2. The communication apparatus according to claim 1, wherein the condition comprises:

a result of measuring a first signal by the MT of the communication apparatus is less than a first threshold, wherein the first signal is sent by the parent node currently connected to the communication apparatus or the source donor base station;

a result of measuring a second signal by the MT of the communication apparatus is greater than a second threshold, wherein the second signal is not sent by the parent node currently connected to the communication apparatus or the source donor base station;

a beam failure occurs on the MT of the communication apparatus on a first carrier link, wherein the first carrier link is a communication link between the communication apparatus and the parent node currently connected to the communication apparatus or the source donor base station;

a radio link failure occurs on the MT of the communication apparatus on a second carrier link, wherein the second carrier link is a communication link between the communication apparatus and the parent node currently connected to the communication apparatus or the source donor base station;

a duration accumulated since the MT of the communication apparatus receives the configuration information from the source donor base station reaches a preset duration;

the MT of the communication apparatus starts or completes a random access process;

the MT of the communication apparatus receives first signaling from the source donor base station, wherein the first signaling indicates the communication apparatus to hand over to a first target donor base station; or the communication apparatus moves out of a target area.

3. The communication apparatus according to claim 2, wherein the MT of the communication apparatus satisfies the condition that the communication apparatus moves out of a target area when:

an area identifier (ID) received by the communication apparatus is inconsistent with a locally stored area ID;

an ID of a cell in which the communication apparatus is currently located is not in a received cell list; or a donor base station corresponding to a node currently connected to the communication apparatus is not in a received donor base station list.

4. The communication apparatus according to claim 2, wherein that the DU of the communication apparatus uses one piece of configuration information in the N pieces of configuration information of the DU comprises:

randomly selecting one piece of configuration information from the N pieces of configuration information of the DU; or selecting, from the N pieces of configuration information of the DU, configuration information that is of the DU and that corresponds to a first target serving node, wherein the first target serving node is one of the N target donor base stations, or the first target serving node is an integrated access and backhaul (IAB) node connected to the first target donor base station in the N target donor base stations, wherein a reference signal sent by the first target serving node has maximum strength;

an operating band of the first target serving node is the same as that of the source donor base station; or a random access occasion of a physical random access channel (PRACH) resource of the first target serving node arrives the earliest.

5. The communication apparatus according to claim 1, wherein the configuration information of the DU comprises a first set of PRACH resource configurations and a second set of PRACH resource configurations, a terminal uses the first set of PRACH resource configurations to initiate random access, and an IAB node uses the second set of PRACH resource configurations to initiate random access.

6. The communication apparatus according to claim 5, wherein the second set of PRACH resource configurations comprises one or more of the following configurations:

a ZC root sequence index, a PRACH configuration index, a periodicity scaling factor, a subframe or slot offset, or a quantity of random access occasion (RACH) occasions that is associated with each synchronization signal block (SSB), wherein the periodicity scaling factor and the PRACH configuration index are used to determine a period of a PRACH resource.

7. The communication apparatus according to claim 5, wherein the configuration information of the MT further comprises one or more of:

backhaul adaptation protocol (BAP) layer configuration information;

data bearer mapping information of the MT; or quality of service configuration information of the MT.

8. The communication apparatus according to claim 1, wherein the transceiver is further configured to:

receive second configuration information from the source donor base station, wherein the second configuration information comprises P pieces of configuration information configured by the DU of the communication apparatus for P terminals, each piece of the P pieces of configuration information corresponds to one terminal identifier, and P is greater than or equal to 1.

9. A communication apparatus, comprising a transceiver, configured to:

send a configuration request message to N target donor base stations, wherein the configuration request message comprises identification information of an integrated access and backhaul (IAB) node and N pieces of cell information of the IAB node, and N is greater than or equal to 1; and receive configuration information sent by the N target donor base stations, wherein configuration information sent by each of the N target donor base stations comprises configuration information of an MT and configuration information of a DU that are configured by the target donor base station for the IAB node, the MT is configured to communicate with a parent node of the IAB node or the communication apparatus, and the DU is configured to communicate with a child node of the IAB node or a terminal.

10. The communication apparatus according to claim 9, wherein the configuration request message further comprises results of measuring synchronization signal blocks (SSBs) of a plurality of target donor base stations by the MT of the IAB node.

11. The communication apparatus according to claim 9, wherein the configuration request message further comprises at least one of the N pieces of cell information of the DU of the IAB node, a physical random access channel (PRACH) resource configuration, or synchronization signal configuration information.

12. A communication apparatus, comprising a transceiver, configured to:
- receive a configuration request message from a source donor base station, wherein the configuration request message comprises identification information of an integrated access and backhaul (IAB) node and N pieces of cell information of the IAB node, and N is greater than or equal to 1; and
- send configuration information to the source donor base station, wherein the configuration information comprises configuration information of an MT and configuration information of a DU that are configured by the communication apparatus for the IAB node, the MT is configured to communicate with a parent node of the IAB node or the source donor base station, and the DU is configured to communicate with a child node of the IAB node or a terminal.

13. The communication apparatus according to claim 12, wherein the configuration information of the DU comprises a first set of PRACH resource configurations and a second set of PRACH resource configurations, a terminal uses the first set of PRACH resource configurations to initiate random access, and an IAB node uses the second set of PRACH resource configurations to initiate random access.

14. The communication apparatus according to claim 13, wherein the second set of PRACH resource configurations comprises one or more of the following configurations:
- a ZC root sequence index, a PRACH configuration index, a periodicity scaling factor, a subframe or slot offset, or a quantity of RACH occasions that is associated with each synchronization signal block (SSB), wherein the periodicity scaling factor and the PRACH configuration index are used to determine a period of a PRACH resource.

15. The communication apparatus according to claim 12, wherein the transceiver is further configured to send a condition to the source donor base station, wherein the condition comprises:
- a result of measuring a first signal by the MT of the IAB node is less than a first threshold, wherein the first signal is sent by a current serving node of the IAB node;
- a result of measuring a second signal by the MT of the IAB node is greater than a second threshold, wherein the second signal is not sent by a current serving node of the IAB node;
- a beam failure occurs on the MT of the IAB node on a first carrier link, wherein the first carrier link is a communication link between the IAB node and a current serving node of the IAB node;
- a radio link failure occurs on the MT of the IAB node on a first carrier link, wherein the first carrier link is a communication link between the IAB node and a current serving node of the IAB node;
- a duration accumulated since the MT of the IAB node receives the configuration information from the source donor base station reaches a preset duration;
- the MT of the IAB node starts or completes a random access process;
- the MT of the IAB node receives first signaling from the source donor base station, wherein the first signaling indicates the IAB node to hand over to a first target donor base station;
- an area identifier;
- a cell list; or
- a donor base station list.

* * * * *